(12) United States Patent
Michihata et al.

(10) Patent No.: US 12,453,614 B2
(45) Date of Patent: Oct. 28, 2025

(54) MEDICAL CONTROL DEVICE AND MEDICAL OBSERVATION DEVICE

(71) Applicants: Sony Olympus Medical Solutions Inc., Tokyo (JP); Sony Corporation, Tokyo (JP)

(72) Inventors: Taihei Michihata, Kanagawa (JP); Hiroshi Myoken, Kanagawa (JP); Satoshi Mitsui, Aichi (JP)

(73) Assignees: Sony Olympus Medical Solutions Inc., Tokyo (JP); Sony Corporation, Tokyo (JP)

( * ) Notice: Subject to any disclaimer, the term of this patent is extended or adjusted under 35 U.S.C. 154(b) by 626 days.

(21) Appl. No.: 17/269,666

(22) PCT Filed: Jun. 14, 2019

(86) PCT No.: PCT/JP2019/023765
§ 371 (c)(1),
(2) Date: Feb. 19, 2021

(87) PCT Pub. No.: WO2020/039716
PCT Pub. Date: Feb. 27, 2020

(65) Prior Publication Data
US 2021/0338040 A1    Nov. 4, 2021

(30) Foreign Application Priority Data
Aug. 21, 2018    (JP) .................. 2018-154787

(51) Int. Cl.
*A61B 90/30* (2016.01)
*A61B 1/00* (2006.01)
(Continued)

(52) U.S. Cl.
CPC ........ *A61B 90/30* (2016.02); *A61B 1/000096* (2022.02); *G06F 3/1423* (2013.01);
(Continued)

(58) Field of Classification Search
CPC . G06F 3/1423; A61B 1/000096; A61B 90/30; A61B 90/37; A61B 1/0661;
(Continued)

(56) References Cited

U.S. PATENT DOCUMENTS

2002/0177780 A1    11/2002  Sendai
2016/0171691 A1*    6/2016  Nakamura ............. G16H 50/20
                                                382/132
(Continued)

FOREIGN PATENT DOCUMENTS

CN    107979718 A    5/2018
JP    S61048333 A    3/1986
(Continued)

OTHER PUBLICATIONS

Communication pursuant to Article 94(3) issued Sep. 3, 2024, in corresponding European Patent Application No. 19 852 342.5, 22pp.

*Primary Examiner* — Eileen M Adams
(74) *Attorney, Agent, or Firm* — XSENSUS LLP

(57) ABSTRACT

A medical control device includes a display controller configured to display, in a display device configured to display images, a medical image generated from an imaging signal generated by an imaging device configured to receive light coming from an observation target; and a brightness controller configured to control the brightness of the imaging signal in such a way that the display controller displays the medical image having a predetermined brightness. When the dynamic range of the display device is set to a second value that is greater than a first value, the brightness controller is configured to perform control to lower the brightness of the imaging signal as compared to the brightness of (Continued)

the imaging signal for displaying the medical image at the predetermined brightness when the dynamic range is set to the first value.

21 Claims, 15 Drawing Sheets

(51) Int. Cl.
| | |
|---|---|
| *G06F 3/14* | (2006.01) |
| *G09G 5/10* | (2006.01) |
| *H04N 9/69* | (2023.01) |
| *A61B 1/045* | (2006.01) |
| *A61B 1/06* | (2006.01) |

(52) U.S. Cl.
CPC ............... *G09G 5/10* (2013.01); *H04N 9/69* (2013.01); *A61B 1/00006* (2013.01); *A61B 1/0005* (2013.01); *A61B 1/045* (2013.01); *A61B 1/0661* (2013.01); *G09G 2320/0276* (2013.01); *G09G 2320/0626* (2013.01); *G09G 2320/0646* (2013.01); *G09G 2320/0673* (2013.01); *G09G 2380/08* (2013.01)

(58) Field of Classification Search
CPC ... A61B 1/045; A61B 1/00006; A61B 1/0005; G09G 5/10; G09G 2380/08; G09G 2320/0673; G09G 2320/0276; G09G 2320/0646; G09G 2340/06; G09G 2320/0626; H04N 5/202; H04N 7/183; H04N 23/63

See application file for complete search history.

(56) References Cited

U.S. PATENT DOCUMENTS

| | | | |
|---|---|---|---|
| 2018/0115695 A1 | 4/2018 | Sudo | |
| 2018/0197505 A1* | 7/2018 | Toma | ..................... H04N 19/46 |
| 2019/0281325 A1* | 9/2019 | Song | ..................... H04N 19/98 |
| 2020/0396430 A1* | 12/2020 | Funada | ..................... G09G 3/36 |

FOREIGN PATENT DOCUMENTS

| | | |
|---|---|---|
| JP | 2002-135589 A | 5/2002 |
| JP | 2003-339634 A | 12/2003 |
| JP | 2004258669 A | 9/2004 |
| JP | 2006081037 A | 3/2006 |
| JP | 2007260019 A | 10/2007 |
| JP | 2016-195378 A | 11/2016 |
| JP | 2016538008 A | 12/2016 |
| JP | 2018-074199 A | 5/2018 |
| JP | 2019-057794 A | 4/2019 |
| JP | 2019-121815 A | 7/2019 |
| KR | 20120013977 A | 2/2012 |
| WO | 2016/104386 A1 | 4/2017 |
| WO | 2018/042717 A1 | 3/2018 |
| WO | 2018/230066 A1 | 4/2020 |

* cited by examiner

<EXAMPLE OF INVERSE-GAMMA CORRECTION IN DISPLAY DEVICE>

MEDICAL CONTROL DEVICE AND MEDICAL OBSERVATION DEVICE

CROSS-REFERENCE TO RELATED APPLICATIONS

The present application is based on PCT filing PCT/JP2019/023765, filed Jun. 14, 2019, which claims priority to JP 2018-154787, filed Aug. 21, 2018, the entire contents of each are incorporated herein by reference.

TECHNICAL FIELD

The present disclosure is related to a medical control device and a medical observation device.

BACKGROUND ART

In a medical setting, when an imaging device takes images of the observation target such as the inside of the body of a patient, there can be times when objects other than the observation target, such as forceps or gauze, are captured as part of the photographic subject. In such a case, the brightness of a taken image, which is displayed in a display device, gets matched to the brightness of forceps or gauze, thereby resulting in an increase in the overall brightness of the image displayed in the display device. That sometimes results in halation in the displayed image, thereby causing a loss of the information and the color of the region that the operator wishes to observe.

Generally, in order to reduce the halation, it is effective to expand the dynamic range of the image sensor. For example, by using a large-sized image sensor having a large cell size, it becomes possible to expand the dynamic range of the image sensor. As a result, it becomes possible to take an image corresponding to a wide dynamic range, thereby enabling achieving reduction in the halation occurring at the time of displaying the image in the display device. Alternatively, in order to reduce the halation, it is also effective to perform HDR (High Dynamic Range) photography in which a plurality of brightness images, which is taken at different timings by varying the shutter speed for imaging, is synthesized. As a result, it becomes possible to generate an image corresponding to a wide dynamic range, thereby enabling achieving reduction in the halation occurring at the time of displaying the image.

For reference, in Patent Literature 1 mentioned below, a technology is disclosed in which, at the time of converting a wide-dynamic-range image into a narrow-dynamic-range image, the luminance at arbitrary positions in the image is optimized based on user operations.

CITATION LIST

Patent Literature

Patent Literature 1: Japanese Patent Application Laid-open No. 2002-135589

DISCLOSURE OF INVENTION

Technical Problem

However, in an endoscope system, since it is demanded to have a compact camera head, it is difficult to use a large-sized image sensor. Moreover, in a photographing method in which a long-exposure image and a short-exposure image are synthesized to generate an HDR image, any movement of the photographic subject or the imaging device causes a blur in the image. Hence, it is not desirable to use such a photographing method in an endoscope system meant for observing the condition of the inside of the body while moving the imaging device. In that regard, as far as an endoscope system is concerned, there is a demand for reducing the halation without using a large-sized image sensor and without using the abovementioned photographing method.

In that regard, in the present disclosure, a medical control device and a medical observation device in a new and improved form are proposed that enable achieving reduction in the halation occurring in the images taken for medical purposes.

Solution to Problem

According to the present disclosure, there is provided a medical control device including: a display controller configured to display, in a display device configured to display images, a medical image generated from an imaging signal generated by an imaging device configured to receive light coming from an observation target; and a brightness controller configured to control brightness of the imaging signal in such a way that the display controller displays the medical image having predetermined brightness, wherein when dynamic range of the display device is set to a second value that is greater than a first value, the brightness controller is configured to perform control to lower brightness of the imaging signal as compared to brightness of the imaging signal for displaying the medical image at the predetermined brightness when the dynamic range is set to the first value.

Moreover, according to the present disclosure, there is provided a medical observation device including: a light source configured to emit light; an imaging device configured to capture an image of an observation target; a display controller configured to display, in a display device configured to display images, a medical image generated from an imaging signal generated by the imaging device configured to receive light coming from an observation target; and a brightness controller configured to control brightness of the imaging signal in such a way that the display controller displays the medical image having predetermined brightness, wherein when dynamic range of the display device is set to a second value that is greater than a first value, the brightness controller is configured to perform control to lower brightness of the imaging signal as compared to brightness of the imaging signal for displaying the medical image at the predetermined brightness when the dynamic range is set to the first value.

Advantageous Effects of Invention

As explained above, according to the present disclosure, it becomes possible to reduce the halation occurring in the images taken for medical purposes. Meanwhile, the abovementioned effect is not necessarily limited in scope and, in place of or in addition to the abovementioned effect, any other effect indicated in the present written description or any other effect that may occur from the present written description can also be achieved.

BEST MODE FOR CARRYING OUT THE INVENTION

Figure 1:
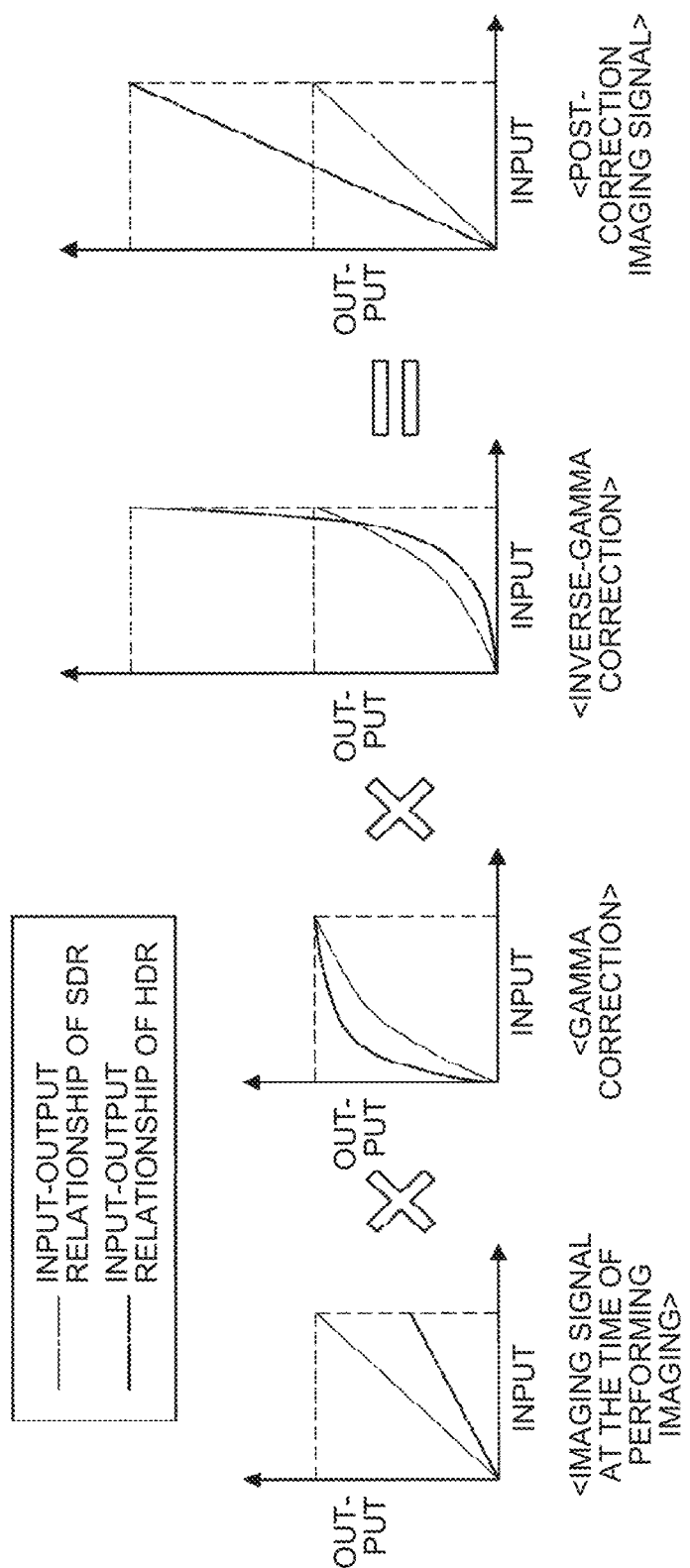
FIG. 1 is an explanatory diagram for explaining the overview of the embodiments of the present disclosure.

Preferred embodiments of the present disclosure are described below in detail with reference to the accompanying drawings. In the present written description and the drawings, the constituent elements having practically identical functional configuration are referred to by the same reference numerals, and their explanation is not given repeatedly.

The explanation is given in the following sequence.

1. Overview
2. First embodiment
   2.1. Exemplary system configuration
   2.2. Exemplary functional configuration
   2.3. Example of operations
3. Second embodiment
   3.1. Exemplary system configuration
   3.2. Exemplary functional configuration
   3.3. Example of operations
4. Modification examples
5. Summary

1. Overview

Explained below with reference to FIG. 1 is the overview of the embodiments of the present disclosure. FIG. 1 is an explanatory diagram for explaining the overview of the embodiments of the present disclosure. The following explanation is given with reference to an example in which the medical control device according to the embodiments of the present disclosure is implemented in an endoscope system used in a medical setting. However, the target system in which the medical control device is implementable is not limited to an endoscope system. Alternatively, for example, the medical control device can also be implemented in a medical observation system in which images of the observation target, such as a patient, are taken using an imaging device.

In an endoscope system, when an imaging device takes images of the observation target such as the inside of the body of a patient, there can be times when objects other than the observation target, such as forceps or gauze, are captured as part of the photographic subject. In such a case, the brightness of a taken image, which is displayed in a display device, gets matched to the brightness of forceps or gauze, thereby resulting in an increase in the overall brightness of the image displayed in the display device. That sometimes results in halation in the displayed image, thereby causing a loss of the information and the color of the region that the operator wishes to observe.

Generally, in order to reduce the halation, it is effective to expand the dynamic range of the image sensor. For example, by using a large-sized image sensor having a large cell size, it becomes possible to expand the dynamic range of the image sensor. As a result, it becomes possible to take an image corresponding to a wide dynamic range, thereby enabling achieving reduction in the halation occurring at the time of displaying the image in the display device. Alternatively, in order to reduce the halation, it is also effective to perform HDR (High Dynamic Range) photography in which a plurality of brightness images, which is taken at different timings by varying the shutter speed for imaging, is synthesized. As a result, it becomes possible to generate an image corresponding to a wide dynamic range, thereby enabling achieving reduction in the halation occurring at the time of displaying the image.

However, in an endoscope system, since it is demanded to have a compact camera head, it is difficult to use a large-sized image sensor. Moreover, in a photographing method in which a long-exposure image and a short-exposure image are synthesized to generate an HDR image, any movement of the photographic subject or the imaging device causes a blur in the image. Hence, it is not desirable to use such a photographing method in an endoscope system meant for observing the condition of the inside of the body while moving the imaging device. In that regard, as far as an endoscope system is concerned, there is a demand for reducing the halation without using a large-sized image sensor and without using the abovementioned photographing method.

The embodiments of the present disclosure are ideated by focusing on the issues explained above, and propose a technology enabling achieving reduction in the halation occurring in the images taken for medical purposes. For example, a medical control device is proposed in which the brightness of an imaging signal, which is generated by an imaging device that receives light coming from the observation target, is controlled; and a medical image generated from the imaging signal is displayed in a display device used for displaying images.

More particularly, in the medical control device, the brightness of an imaging signal is controlled in such a way that, higher the dynamic range of a display device 20, the lower is the brightness of the imaging signal. That is because, higher the dynamic range of a display device, the more it becomes possible for the display device to display a medical image having a high brightness; and, higher the brightness, the greater becomes the possibility of halation occurring the displayed medical image. Thus, in the medical control device, depending on the brightness of the medical image to be displayed in a display device, an image of the observation target is taken by lowering the brightness so as to enable achieving reduction in the halation that occurs when the medical image is displayed in the display device by increasing the brightness.

In the embodiments according to the present disclosure, a display device indicating the dynamic range of a high level is a display device having the high dynamic range (HDR). Herein, an HDR display device is a display device having the maximum luminance of 1000 nits or higher for the displayable images. On the other hand, a display device indicating the dynamic range of a low level is a display device having the standard dynamic range (SDR). Herein, an SDR display device is a display device having the maximum luminance to be lower than 1000 nits for the displayable images. Meanwhile, the types of display devices based on the dynamic range are not limited to HDR display devices and SDR display devices, and there can be display devices based on some other dynamic ranges. The following explanation is given for an example in which the display device used for displaying medical images is either an HDR display device or an SDR display device.

In FIG. 1, a dashed-dotted line graph represents the input-output relationship in an SDR display device; and a dashed-two dotted line graph represents the input-output relationship in an HDR display device. As illustrated in FIG. 1, an imaging signal according to the embodiments of the present disclosure is subjected to gamma correction and inverse-gamma correction before being eventually output as the imaging signal.

For example, when an HDR display device is used to display medical images, the observation target is captured by lowering the brightness. Hence, as illustrated in a graph of the imaging signal at the time of performing imaging, the output of the HDR display device is smaller as compared to the output of the SDR display device. However, since gamma correction and inverse-gamma correction is performed with respect to the imaging signal obtained in the case of using the HDR display device, the HDR display device becomes able to perform a larger output than the output of the SDR display device, as illustrated in a graph of post-correction imaging signal in FIG. 1.

Till now, with reference to FIG. 1, the explanation was given about the overview of the embodiments according to the present disclosure. Given below is the explanation of a first embodiment.

2. First Embodiment

Explained below with reference to FIGS. 2 to 10 is the first embodiment.

2.1. Exemplary System Configuration

Figure 2:
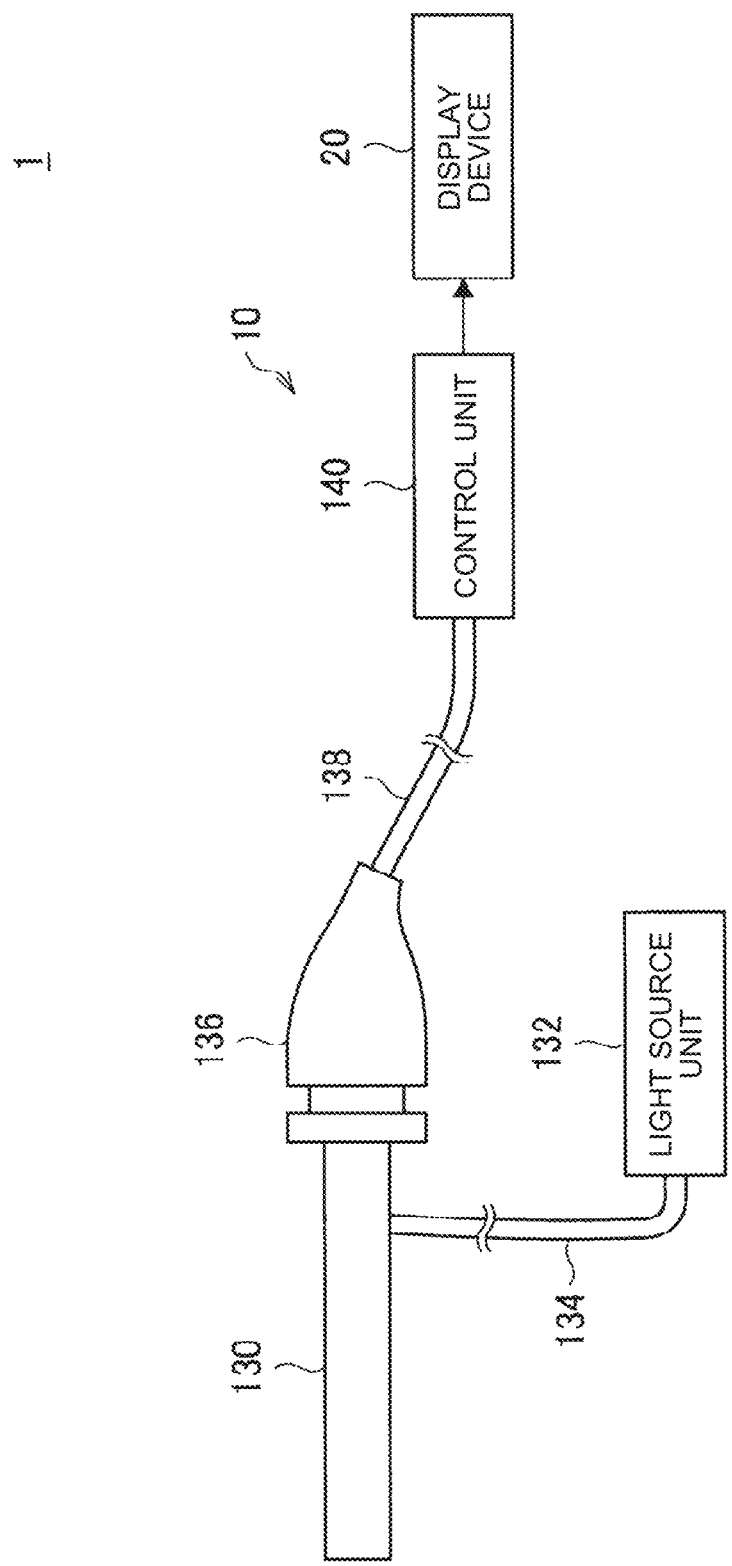
FIG. 2 is an explanatory diagram illustrating an exemplary configuration of a medical observation system according to a first embodiment.

Explained below with reference to FIG. 2 is an exemplary configuration of a medical observation system according to the first embodiment of the present disclosure. FIG. 2 is an explanatory diagram illustrating an exemplary configuration of a medical observation system 1 according to the first embodiment.

As illustrated in FIG. 2, the medical observation system 1 according to the first embodiment includes, for example, a medical observation device 10 and the display device 20. For example, when the medical observation device 10 illustrated in FIG. 2 is used during a surgery, the operator observes the operation region while referring to the medical image displayed in the display screen of the display device 20, and performs various operative procedures according to the surgical technique. Moreover, in an identical manner, an assistant to the operator refers to the medical image displayed in the display screen of the display device 20 and assists the operator in performing various procedures. In the following explanation, the persons involved in the surgery, such as an operator and an assistant, are collectively referred to as users.

Meanwhile, the medical observation system 1 according to the first embodiment is not limited to the example illustrated in FIG. 2. For example, the medical observation system 1 according to the first embodiment can further include a medical control device (not illustrated) that controls various operations performed in the medical observation device 10. In the medical observation system 1 illustrated in FIG. 2, as described later, since a control unit (described later) is included therein, the medical observation device 10 also functions as a medical control device (not illustrated).

Examples of the medical control device (not illustrated) include "a medical controller" and "a computer such as a server". Meanwhile, the medical control device (not illustrated) can alternatively be an IC (Integrated Circuit) that can be embedded in a device explained above.

The medical observation system 1 according to the first embodiment can be configured to include one or more medical observation devices 10 and one or more display devices 20. If a plurality of medical observation devices 10 is included, a display control operation (described later) is performed in each medical observation device 10. Moreover, when the medical observation system 1 according to the first embodiment is configured to include a plurality of medical observation devices 10 and a plurality of display devices 20, either the medical observation devices 10 and the display devices 20 can have a one-to-one correspondence or a plurality of medical observation devices 10 can be associated to a single display device 20. If a plurality of medical observation devices 10 is associated to a single display device 20; for example, a switching operation can be performed in the display device 20 for switching the medical observation device 10 in which the medical image is to be displayed in the display screen.

Given below is the explanation of each device constituting the medical observation system 1 illustrated in FIG. 2 according to the first embodiment.

(1) Medical Observation Device 10

The medical observation device 10 illustrated in FIG. 2 includes, for example, an insertion member 130, a light source unit 132, a light guide 134, a camera head 136, a cable 138, and a control unit 140.

Meanwhile, although not illustrated in FIG. 2, the medical observation device 10 can also include one or more processors (not illustrated) configured with an arithmetic circuit such as an MPU (Micro Processing Unit); a ROM (Read Only Memory, not illustrated); a RAM (Random Access Memory, not illustrated); a recording medium (not illustrated); and a communication device (not illustrated). The medical observation device 10 operates, for example, on the electrical power supplied from an internal light source such as a battery installed therein or on the electrical power supplied from an external power source connected thereto.

The processor (not illustrated) functions as the control unit (not illustrated) of the medical observation device 10. The ROM (not illustrated) is used to store programs to be used by the processor (not illustrated) and to store control data such as operation parameters. The RAM (not illustrated) is used to temporarily store the programs executed by the processor (not illustrated).

The recording medium (not illustrated) functions as a memory unit (not illustrated) of the medical observation device 10. In the recording medium (not illustrated), for example, the data related to a display control method according to the first embodiment is stored, and a variety of data such as various applications are stored. Examples of the recording medium (not illustrated) include a magnetic recording medium, such as a hard disk; and a nonvolatile memory, such as a flash memory. Meanwhile, alternatively, the recording medium (not illustrated) can be detachably-attachable to the medical observation device 10.

The communication device (not illustrated) is a communication unit of the medical observation device 10, and fulfils the role of performing wired communication or wireless communication with external devices such as the display device 20. Examples of the communication device (not illustrated) include an IEEE 802.15.1 port and a transmission-reception circuit (wireless communication); an IEEE 802.11 port and a transmission-reception circuit (wireless communication); a communication antenna and an RF circuit (wireless communication); and a LAN terminal and a transmission-reception circuit (wired communication).

(1-1) Insertion Member 130

The insert on member 130 is a thin elongated member that includes an optical system for collecting the incident light. The front end of the insertion member 130 is inserted into, for example, the body cavity of a patient. The rear end of the insertion member 130 is connected in a detachably-attachable manner to the front end of the camera head 136. Moreover, the insertion member 130 is connected to the light source unit 132 via the light guide 134, and receives supply of light from the light source unit 132.

The insertion member 130 can be made of, for example, a nonflexible material or a flexible material. Depending on the material used in making the insertion member 130, the medical observation device 10 can be called a rigid endoscope or a flexible endoscope.

(1-2) Light Source Unit 132

The light source unit 132 is connected to the insertion member 130 via the light guide 134. The light source unit 132 supplies light to the insertion member 130 via the light guide 134.

The light source unit 132 includes, for example, a plurality of light sources that emit light of different wavelengths. Examples of the plurality of light sources of the light source unit 132 include a light source emitting red light, a light source emitting green light, and a light source emitting blue light. Examples of the light source emitting red light include one or more red-light emitting diodes.

Examples of the light source emitting green light include one or more green-light emitting diodes. Examples of the light source emitting blue light include one or more blue-light emitting diodes. Meanwhile, it goes without saying that the plurality of light sources of the light source unit 132 are not limited to the example given above. Moreover, for example, in the light source unit 132, a plurality of light sources is installed either on a single chip or on a plurality of chips.

The light source unit 132 is connected to the control unit 140 in a wired manner or a wireless manner, and the emission of light from the light source unit 132 is controlled by the control unit 140.

The light supplied to the insertion member 130 exits from the front end of the insertion member 130, and then the observation target such as the body tissue of the patient gets irradiated with that light. Subsequently, the reflected light from the observation target is collected by the optical system installed in the insertion member 130.

(1-3) Camera Head 136

The camera head 136 has the function of taking images of the observation target. The camera head 136 is connected to the control unit 140 via the cable 138 that represents a signal transmission member.

The camera head 136 includes an image sensor; takes an image of the observation target by performing photoelectric conversion of the reflected light that is reflected from the observation target and that is collected by the insertion member 130; and generates an imaging signal (a signal representing a medical image). Then, the camera head 136 outputs the generated imaging signal to the control unit 140 via the cable 138. Examples of the image sensor installed in the camera head 136 include an image sensor in which a plurality of imaging elements such as CMOSs (Complementary Metal Oxide Semiconductors) or CCDs (Charge Coupled Devices) is used.

In the medical observation device 10 functioning as an endoscope device; for example, the insertion member 130, the light source unit 132, and the camera head 136 fulfil the role of "an imaging device that is inserted into the body cavity of a patient and that takes images of the body cavity".

Meanwhile, the medical observation device 10 functioning as an endoscope device can be configured to include, for example, a plurality of imaging devices functioning as, what are called, stereo cameras. In the configuration including imaging devices functioning as stereo cameras, in an identical manner to the medical observation device 10 constituting the medical observation system according to the first embodiment, the optical system can be a Galilean optical system or a Greenough-type optical system.

(1-4) Control Unit 140

The control unit 140 controls the imaging device. More particularly, the control unit 140 controls the light source unit 132 and the camera head 136.

moreover, the control unit 140 includes a communication device (not illustrated) for transmitting imaging signals, which are output from the camera head 136, to the display device 20 using arbitrary wireless communication or arbitrary wired communication. Herein, the control unit 140 can transmit imaging signals and display control signals to the display device 20.

Examples of the communication device (not illustrated) included in the control unit 140 include an IEEE 802.15.1 port and a transmission-reception circuit (wireless communication); an IEEE 802.11 port and a transmission-reception circuit (wireless communication); a communication antenna and an RF circuit (wireless communication); an optical communication device (wired communication or wireless communication); and a LAN terminal and a transmission-reception circuit (wired communication). Meanwhile, the communication device (not illustrated) can be configured to be able to perform communication with one or more external devices using a plurality of communication methods.

Moreover, the control unit 140 can perform predetermined processing with respect to an imaging signal output from the camera head 136, and can transmit the processed imaging signal to the display device 20. Examples of the predetermined processing with respect to an imaging signal include white balance adjustment, image enlargement/reduction according to the electronic zoom function, and inter-pixel correction.

The control unit 140 can also store the medical image that is based on the imaging signal. Examples of the control unit 140 include a CCU (Camera Control Unit).

Thus, the medical observation device 10 functioning as an endoscope device has the hardware configuration as illustrated in FIG. 2. In the medical observation device 10 functioning as an endoscope device, for example, the insertion member 130, the light source unit 132, and the camera head 136 fulfil the role of an imaging device; and the imaging performed in the imaging device is controlled by the control unit 140.

(2) Display Device 20

The display device 20 is a display unit in the medical observation system 1 according to the first embodiment and is equivalent to an external display device from the perspective of the medical observation device 10. The display device 20 displays, in the display screen, various images such as medical images taken in the medical observation device 10 and images related to the UI (User Interface). More particularly, the display device 20 generates a medical image based on an imaging signal transmitted from the control unit 140, and displays the generated medical image on the display screen.

Moreover, the display device 20 can also include a configuration capable of performing 3D display according to an arbitrary method. The display performed in the display device 20 is controlled by, for example, the medical observation device 10 or a medical control device (not illustrated).

In the medical observation system 1, the display device 20 is installed at an arbitrary location, such as the wall surface, the ceiling, or the floor of the operating room for surgery, that is visible to the users present in the operating room for surgery.

Examples of the display device 20 include a liquid crystal display, an organic EL (Electro-Luminescence) display, and a CRT (Cathode Ray Tube) display.

However, the display device 20 is not limited by the examples given above. Alternatively, for example, the display device 20 can be an arbitrary wearable device, such as a head-mounted display or an eyewear-type device, that as wearable by a user.

The display device 20 operates, for example, on the electrical power supplied from an internal light source such as a battery installed therein or on the electrical power supplied from an external power source connected thereto.

2.2. Exemplary Functional Configuration

Explained below with reference to FIGS. 3 to 7 is an exemplary functional configuration of the medical observation system 1.

2.2.1. Exemplary Functional Configuration of Medical Observation Device 10

Figure 3:
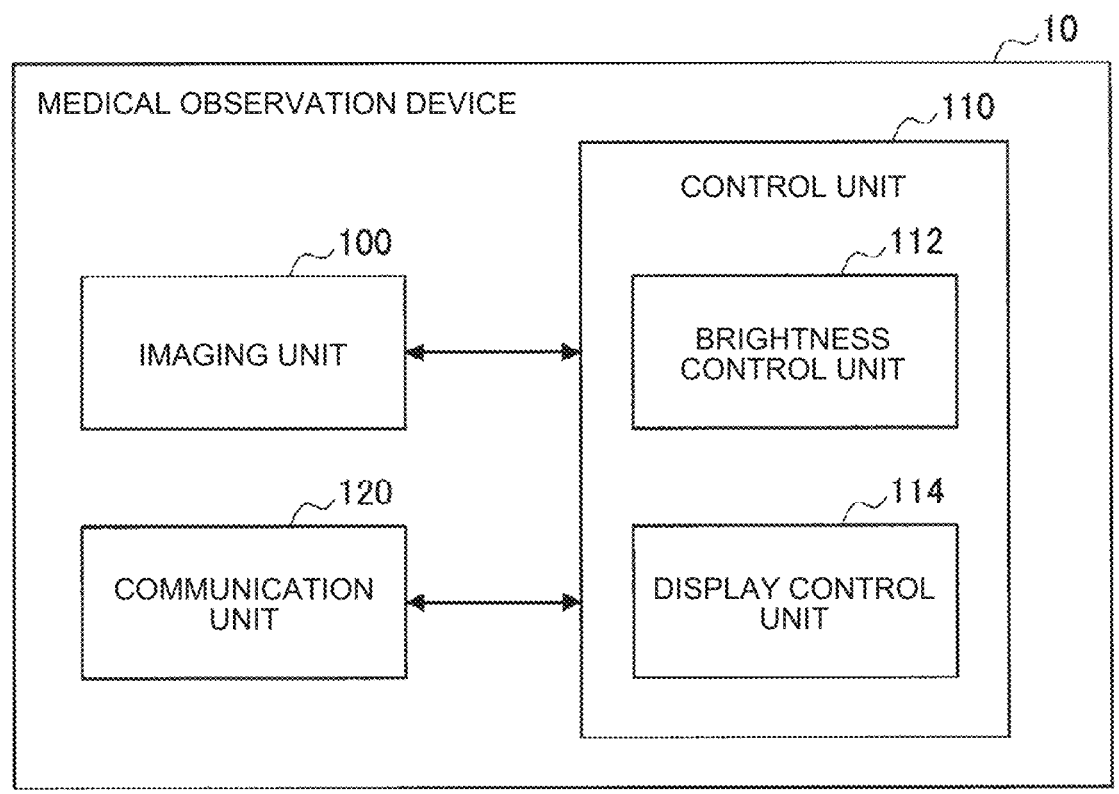
FIG. 3 is a block diagram illustrating an exemplary functional configuration of a medical observation device according to the first embodiment.
Figure 4:
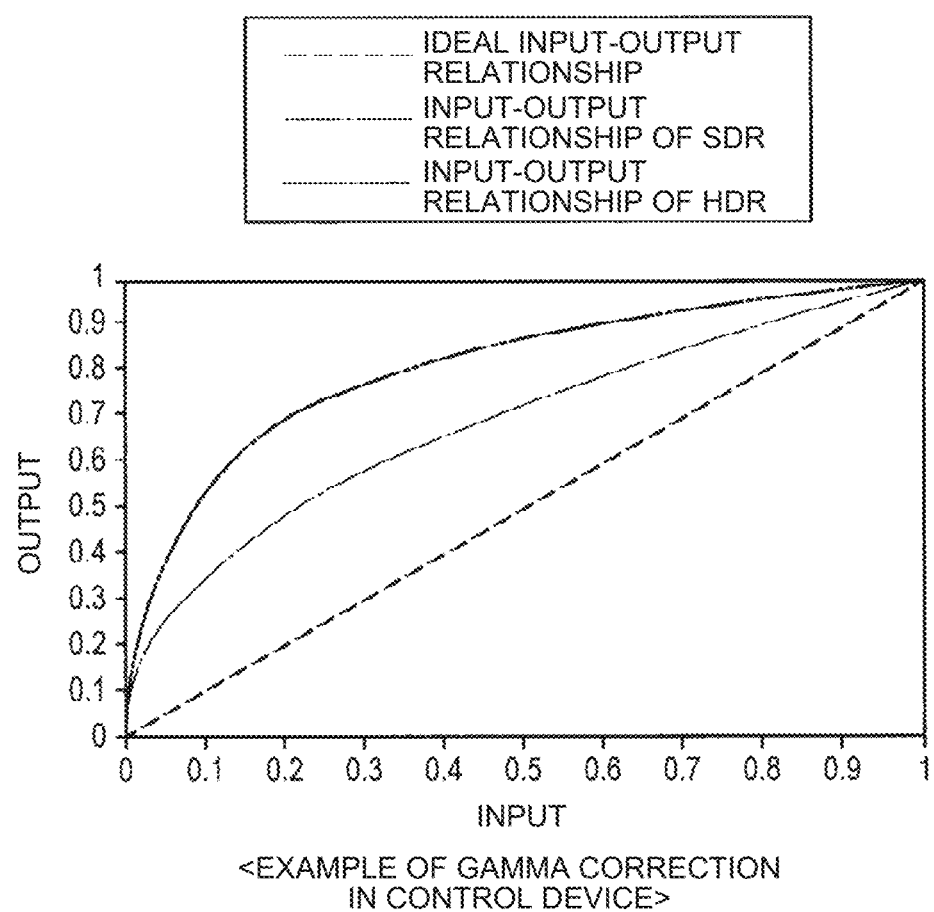
FIG. 4 is an explanatory diagram illustrating the input-output relationship in the medical observation device according to the first embodiment.

Explained below with reference to FIGS. 3 and 4 is an exemplary functional configuration of the medical observation device 10 according to the first embodiment. FIG. 3 is a block diagram illustrating an exemplary functional configuration of the medical observation device 10 according to the first embodiment. As illustrated in FIG. 3, the medical observation device 10 according to the first embodiment includes, for example, an imaging unit 100, a control unit 110, and a communication unit 120.

(1) Imaging Unit 100

The imaging unit 100 takes images of the observation target. The imaging unit 100 is configured with, for example, the insertion member 130, the light source unit 132, and the camera head 136 illustrated in FIG. 2. The imaging performed by the imaging unit 100 is controlled by, for example, the control unit 110.

(2) Control Unit 110

The control unit 110 is configured with, for example, the processor (not illustrated) explained earlier, and fulfils the role of controlling the medical observation device 10 in entirety. Moreover, the control unit 110 fulfils a leading role in performing an imaging control operation (described later) and the display control operation (described later). The imaging control operation and the display control operation performed by the control unit 110 can be performed in a dispersed manner across a plurality of processing circuits (for example, a plurality of processors).

More particularly, as illustrated in FIG. 3, the control unit 110 includes a brightness control unit 112 and a display control unit 114.

(2-1) Brightness Control Unit 112

The brightness control unit 112 controls the imaging device constituting the imaging unit 100. For example, the brightness control unit 112 performs the imaging control operation for controlling the brightness when the imaging device takes images of the observation target. More particularly, the brightness control unit 112 identifies the dynamic range of the display device 20 based on determination information that enables determination of the display device 20. Then, the brightness control unit 112 decides on the brightness target value corresponding to the identified dynamic range of the display device 20. More particularly, the imaging control operation includes a determination information obtaining operation, a determination operation, and a brightness target value deciding operation explained below.

Determination Information Obtaining Operation

The brightness control unit 112 firstly obtains the determination information that enables determination of the display device 20 connected to the medical observation device 10. The determination information can contain operation information and dynamic range information.

The operation information represents information related to an operation input by the user by performing a predetermined operation. For example, the user performs a selection operation for selecting the display device 20 in which the medical images are to be displayed. The brightness control unit 112 obtains the information related to the user-selected display device 20 as the operation information (the determination information).

The dynamic range information represents information indicating the dynamic range of the display device 20. For example, the brightness control unit 112 obtains the dynamic range information from the display device 20 connected to the medical observation device 10. Alternatively, the brightness control unit 112 can obtain identification information from the display device 20 connected to the medical observation device 10; and then can obtain the dynamic range information of the display device 20 based on the identification information. For example, based on the obtained identification information, the brightness control unit 112 refers to the dynamic range information of the display device 20 as registered in advance in the memory unit of the medical observation device 10, and obtains the dynamic range information of the display device 20.

Meanwhile, if the medical observation device 10 and the display device 20 are connected to each other by a cable enabling only one-way communication, then the dynamic range information or the identification information cannot be obtained from the display device 20. Hence, the brightness control unit 112 obtains the operation information explained earlier. On the other hand, if the medical observation device 10 and the display device 20 are connected to each other by a cable enabling two-way communication, then the brightness control unit 112 obtains the dynamic range information or the identification information from the display device 20. Examples of a cable enabling only one-way communication include an SDI (Serial Digital Interface) cable. Examples of a cable enabling two-way communication include an HDMI (High-Definition Multimedia Interface) cable and a display port cable. When the medical observation device 10 and the display device 20 are connected using an SDI cable, the medical observation device 10 sends a user ID to the display device 20; and the display device 20 can perform inverse-gamma correction and brightness adjustment according to that user ID. In that case, the user ID is assumed to be associated to the display device 20 used by a user.

Determination Operation

The brightness control unit 112 identifies the dynamic range of the display device 20 based on the obtained determination information. For example, the brightness control unit 112 identifies the dynamic range of the display device 20 based on a predetermined selection operation. More particularly, the brightness control unit 112 refers to the operation information obtained as the determination information, and confirms the display device 20 selected according to the selection operation performed by the user. Then, the brightness control unit 112 identifies the dynamic range of the user-selected display device 20 as the dynamic range of the display device 20 connected to the medical observation device 10. Alternatively, the brightness control unit 112 identifies the dynamic range of the display device 20 based on the dynamic range information obtained as the determination information. More particularly, as the dynamic range of the display device 20 connected to the medical observation device 10, the brightness control unit 112 identifies the dynamic range indicated by the dynamic range information obtained as the determination information.

Based on the dynamic range of the display device 20 as identified in the determination operation, the brightness control unit 112 decides on the manner in which the imaging unit 100 is to be made to take images of the observation target. For example, when the dynamic range of the display device 20 is an HDR, the display device 20 displays a medical image by increasing the luminance. For that reason, the brightness control unit 112 decides to make the imaging unit 100 take an image of the observation target by lowering the brightness. On the other hand, when the dynamic range of the display device 20 is an SDR, the display device 20 displays a medical image without increasing the luminance. For that reason, the brightness control unit 112 decides to make the imaging unit 100 take an image of the observation target without lowering the brightness.

Brightness Target Value Deciding Operation

According to the result of the determination result, the brightness control unit 112 decides on the brightness target value at the time of taking images of the observation target. For example, when it is decided to make the imaging unit 100 take images of the observation target by lowering the brightness, the brightness control unit 112 compares the dynamic range of the display device 20 with a predetermined dynamic range and decides on the brightness target value based on the result of comparison. More particularly, the brightness control unit 112 extracts the difference between the maximum value of the dynamic range of the display device 20 and the maximum value of the predetermined dynamic range; and decides on the brightness target value based on the difference.

For example, if the maximum value of the dynamic range of the display device 20 is equal to n times of the maximum value of the predetermined dynamic range (where n is a real number), then the brightness control unit 112 sets the brightness target value in the display device 20 to 1/n-th of the brightness target value corresponding to the predetermined dynamic range. More particularly, assume that the dynamic range of the display device 20 connected to the medical observation device 10 is an HDR and assume that the maximum value of the dynamic range of the HDR display device 20 is twice the maximum value of the dynamic range of the SDR display device 20. In that case, the brightness control unit 112 sets the brightness target value in the HDR display device 20 to half of the brightness target value in the SDR display device 20.

Meanwhile, the brightness target value can be decided in such a way that there is an increase in the brightness when the imaging device takes images of the observation target. Moreover, at the time of calculating the brightness target value in the display device 20, the scale factor to be multiplied to the target value corresponding to the predetermined dynamic range is not limited to 1/n-th, and can be set to an arbitrary scale factor.

Brightness Control Operation

For example, the brightness control unit 112 controls the amount of light emitted by the light source unit 132 and adjusts the brightness at the time when the imaging unit 100 takes images of the observation target. More particularly, if the brightness at the time of imaging is to be increased, the brightness control unit 112 increases the amount of light emitted by the light source unit 132. That leads to an increase in the amount of light projected onto the observation target. Hence, the brightness at the time of imaging increases, and the brightness of the imaging signals also increases. On the other hand, if the brightness at the time of imaging is to be reduced, the brightness control unit 112 lowers the amount of light emitted by the light source unit 132. That leads to a decrease in the amount of light projected onto the observation target. Hence, the brightness at the time of imaging decreases, and the brightness of the imaging signals also decreases.

Other Control Operations

For example, the brightness control unit 112 can also control one or more functions provided in a commonly-used microscope of the electronic imaging type, such as controlling the AF function including the zoom function (the optical zoom function and the electronic zoom function).

(2-2) Display Control Unit 114

The display control unit 114 controls the display of medical images in the display device 20. Regarding the control of the display of medical images, for example, the display control unit 114 performs the display control operation and controls the brightness at the time displaying a medical image in the display device 20.

Explained below with reference to FIG. 4 is the gamma correction. FIG. 4 is an explanatory diagram illustrating the input-output relationship in the medical observation device 10 according to the first embodiment. In the graph illustrated in FIG. 4, the vertical axis represents the data input to the medical observation device 10, and the horizontal axis represents the data output from the medical observation device 10.

Usually, in the display device 20, ideally, the image corresponding to the input imaging signal is output without modification. In order to ensure such ideal output of the image, the gamma value indicating the input-output relationship in the display device 20 needs to be set to 1.0. However, generally, the gamma value in the display device 20 is set to 2.2 instead of 1.0; and an operation called inverse-gamma correction is performed in which the RGB values of the input imaging signal are reduced so as to lower the brightness of the medical image corresponding to the imaging signal. For that reason, if the imaging signal is input to the display device 20 without modification from the state attained at the time of imaging, the medical image gets displayed with a lower brightness due to the inverse-gamma correction performed in the display device 20. Hence, before the imaging signal is input to the display device 20, if the RGB values are increased in advance, the medical image can be prevented from being displayed with a lower brightness in the display device 20. The operation of increasing the RGB values in advance is called gamma correction.

When the gamma value is set to 1.0, the input-output relationship becomes as illustrated by a dashed line in FIG. 4. When the gamma line is set to 2.2, the input-output relationship becomes as illustrated by a dashed-dotted line in FIG. 4, and is equivalent to the input-output relationship in the SDR display device 20. On the other hand, the input-output relationship in the HDR display device 20 becomes as illustrated by a dashed-two dotted line in FIG. 4. The dashed-two dotted line represents the input-output relationship based on the HLG (Hybrid Log Gamma) method. Alternatively, the input-output relationship in the HDR display device 20 can be based on the PQ (Perceptual Quantization) method.

In the medical observation device 10 according to the first embodiment, the display control unit 114 performs gamma correction with respect to the imaging signal based on the gamma value of the display device 20, and displays the medical image, which is generated from the post-gamma-correction imaging signal, in the display device 20. For example, the display control unit 114 performs gamma correction with respect to the imaging signal in such a way that the intermediate luminance values of the medical image, which is displayed in the concerned display device 20 and in the display device 20 having a predetermined gamma value, are identical. More particularly, when a medical image is to be displayed in the HDR display device 20, the display control unit 114 performs gamma correction in such a way that the intermediate luminance values of the medical image, which is displayed in the HDR display device 20 and in the SDR display device 20 having the gamma value of 2.2, are identical. As a result, the medical image can be displayed in each type of the display device 20 in such a way that the medical image has an identical visibility in the HDR display device 20 and in the SDR display device 20.

(3) Communication Unit 120

The communication unit 120 is a communication unit installed in the medical observation device 10, and fulfils the role of performing wireless communication or wired communication with external devices such as the display device 20. The communication unit 120 is configured with, for example, the abovementioned communication device (not illustrated). The communication performed by the communication unit 120 is controlled by, for example, the control unit 110.

2.2.2. Exemplary Functional Configuration of Display Device 20

Figure 5:
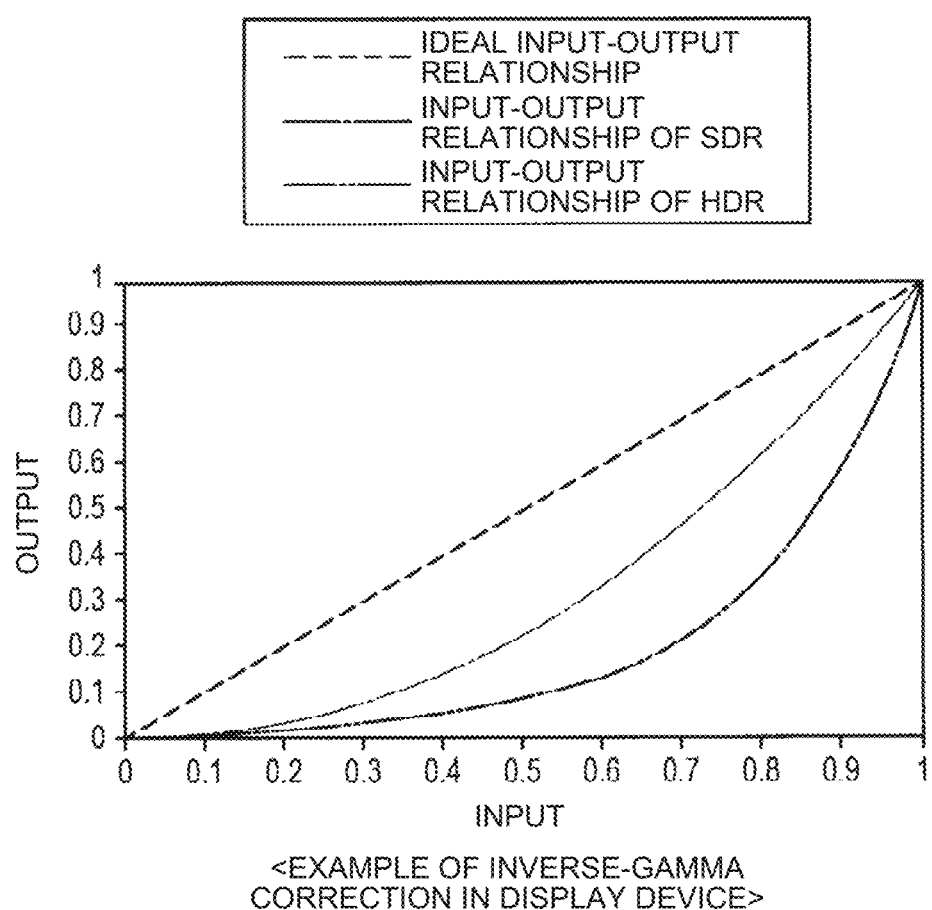
FIG. 5 is an explanatory diagram illustrating an example of the input-output relationship in a display device according to the first embodiment.
Figure 6:
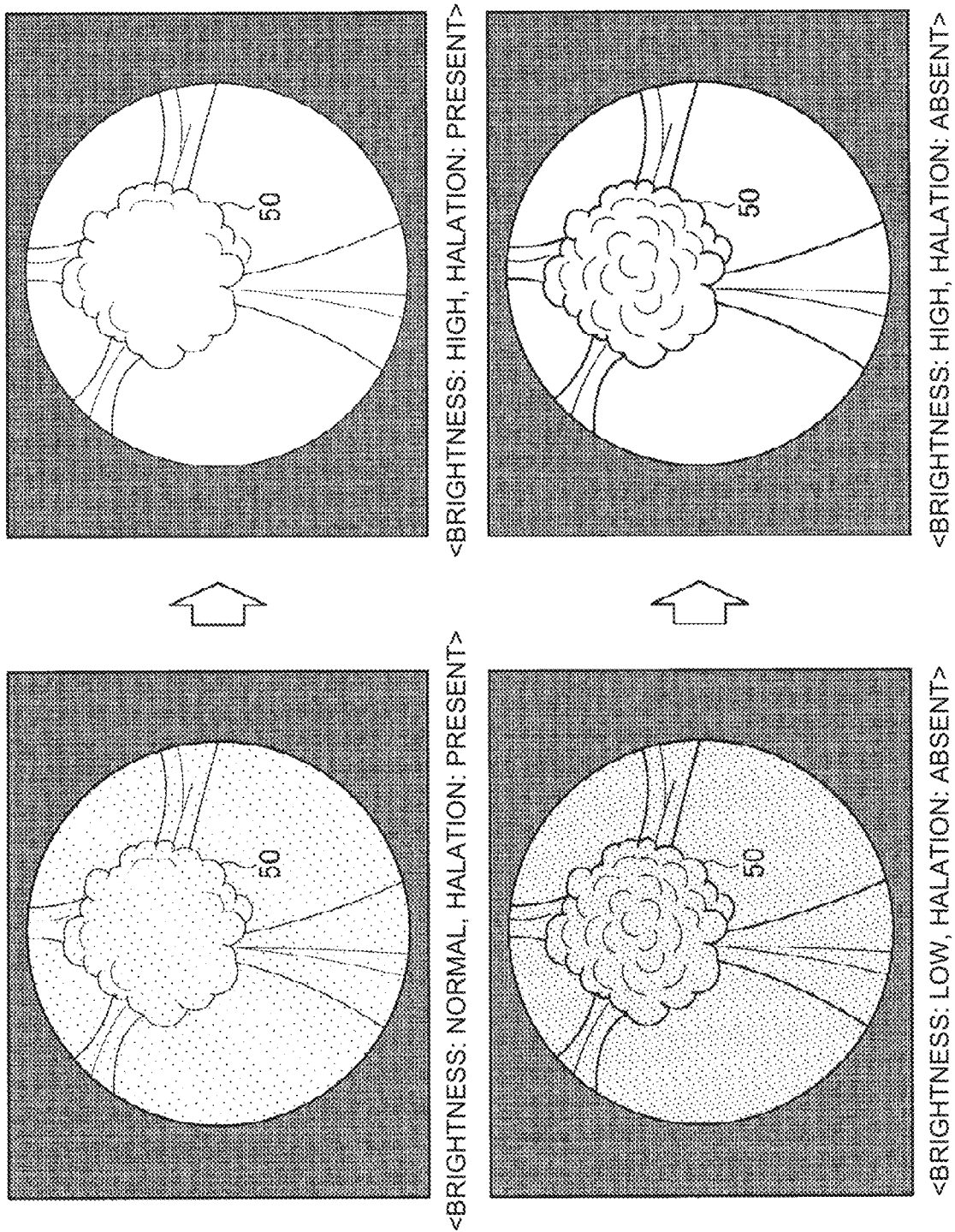
FIG. 6 is an explanatory diagram illustrating an exemplary display of a medical image according to the first embodiment.

Explained below with reference to FIGS. 5 and 6 is an exemplary functional configuration of the display device 20 according to the first embodiment. FIG. 5 is an explanatory diagram illustrating an example of the input-output relationship in the display device 20 according to the first embodiment. In the graph illustrated in FIG. 5, the horizontal axis represents the data input to the display device 20, and the vertical axis represents the data output from the display device 20.

The display device 20 at least includes a control unit (not illustrated). The control unit performs inverse-gamma correction with respect to the imaging signal that has already-increased RGB values due to gamma correction. Thus, the control unit reduces the RGB values of the imaging signal and brings them closer to the ideal input-output relationship indicated by a dashed line in FIG. 5, and then displays the imaging signal as a medical image in the display device 20.

When a medical image is to be displayed in the SDR display device 20, the control unit performs inverse-gamma correction based on the input-output relationship indicated by the dashed-dotted line illustrated in FIG. 5. The input-output relationship indicated by the dashed-dotted line represents the input-output relationship in the case in which the gamma value is set to 2.2. When a medical image is to be displayed in the HDR display device 20, the control unit performs inverse-gamma correction based on the input-output relationship indicated by the dashed-two dotted line illustrated in FIG. 5. The input-output relationship indicated by the dashed-two dotted line represents the input-output relationship based on the HLG (Hybrid Log Gamma) method. Alternatively, in the HDR display device 20, the input-output relationship can be based on the PQ (Perceptual Quantization) method.

Explained below with reference to FIG. 6 is a medical image displayed in the display device 20. FIG. 6 is an explanatory diagram illustrating an exemplary display of a medical image according to the first embodiment. In the upper part of FIG. 6, a medical image displayed in the SDR display device 20 is illustrated. In the lower part of FIG. 6, a medical image displayed in the HDR display device 20 is illustrated. Moreover, in the left part of FIG. 6, the medical image obtained at the time of imaging is illustrated. In the right part of FIG. 6, the post-correction medical mage is illustrated.

The top left medical image is meant to be displayed in an SDR display device. Hence, that medical image has been taken at the normal brightness without lowering the brightness, and halation has occurred in an observation target 50. In the top right medical image obtained by correcting the top left medical image, there is an increase in the brightness due to correction as compared to the top left medical image, but the halation in the observation target 50 is still present.

The bottom left medical image is meant to be displayed in an HDR display device. Hence, that medical image has been taken at a lower brightness than the brightness of the top left medical image, and there is no halation in the observation target 50. In the bottom right medical image obtained by correcting the bottom left medical image, even though the correction has resulted in a higher brightness as compared to the brightness of the bottom left medical image, there is no halation in the observation target 50.

2.3. Example of Operations

Explained below with reference to FIGS. 7 to 10 as an example of the operations performed in the medical observation system 1 according to the first embodiment.

(1) Example of Operations of Entire Medical Observation System 1

Figure 7:
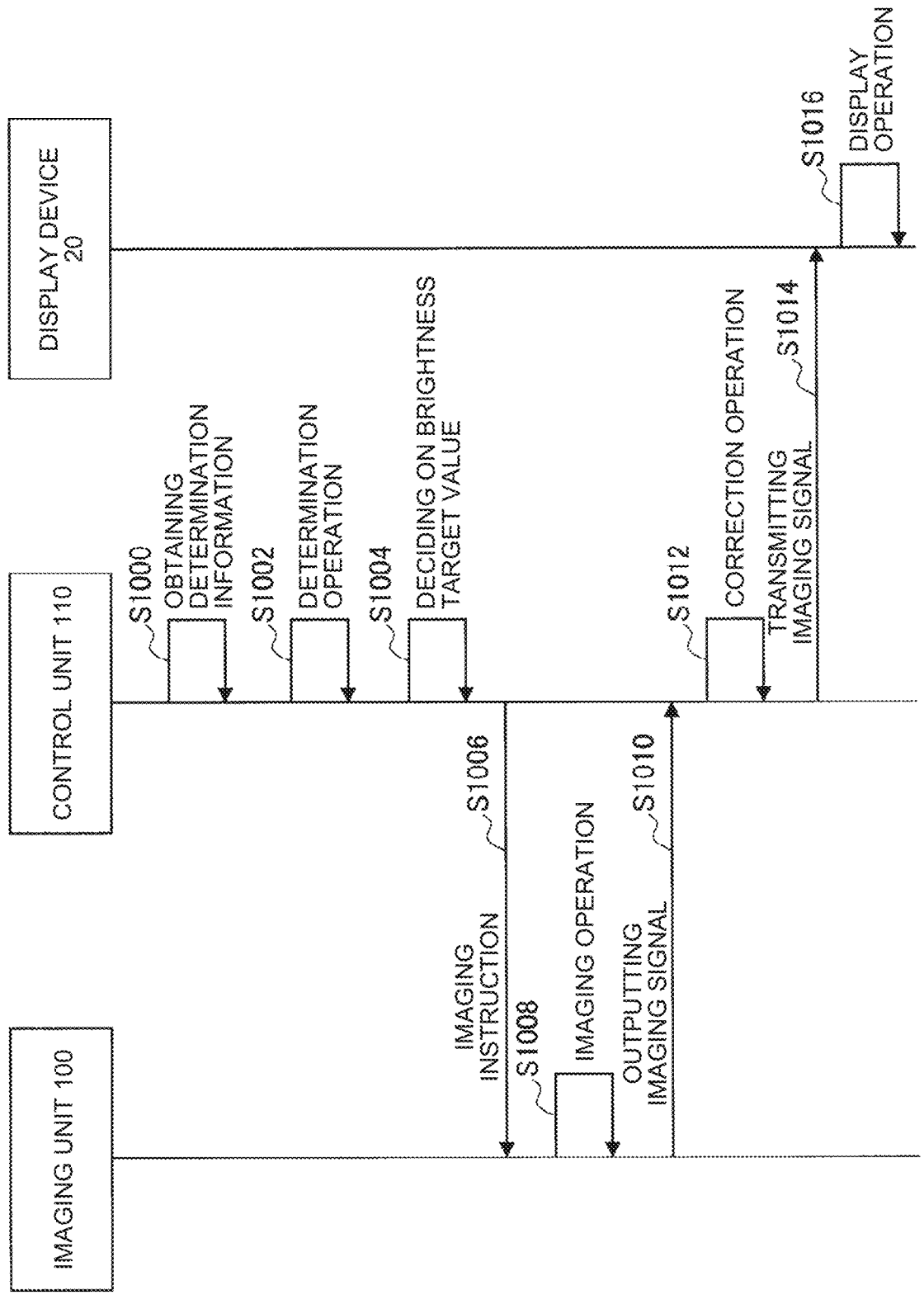
FIG. 7 is a sequence diagram for explaining the flow of operations performed in the medical observation system according to the first embodiment.

Firstly, the explanation is given about a sequence of operations performed in the medical observation system 1 for displaying a medical image in the display device 20. FIG. 7 is a sequence diagram for explaining the flow of operations performed in the medical observation system 1 according to the first embodiment.

As illustrated in FIG. 7, firstly, the control unit 110 obtains the determination information (Step S1000). Then, based on the determination information, the control unit 110 performs the determination operation for determining the dynamic range of the display device 20 that is connected to the medical observation device 10 (Step S1002). Regarding the details of the determination operation, the explanation is given later. Subsequently, based on the result of the determination operation, the control unit 110 decides on the brightness target value (Step S1004). Then, the control unit 110 outputs an imaging instruction to the imaging unit 100 for taking a medical image having the brightness equivalent to the decided brightness target value (Step S1006).

Upon receiving input of the imaging instruction from the control unit 110, the imaging unit 100 takes an image of the observation target according to the imaging instruction (Step S1008) and outputs an imaging signal, which is obtained as a result of performing imaging, to the control unit 110 (Step S1010).

Upon receiving the imaging signal from the imaging unit 100, the control unit 110 performs a correction operation with respect to the imaging signal according to the display device 20 to which the imaging signal is to be transmitted (Step S1012). Regarding the details of the correction operation, the explanation is given later. After performing the correction operation, the control unit 110 sends the corrected imaging signal to the display device 20 via the communication unit 120 (Step S1014).

Upon receiving the imaging signal, the display device 20 performs the display operation for displaying the imaging signal as a medical image (Step S1016). Regarding the details of the display operation, the explanation is given later. As a result of performing the display operation, the medical image gets displayed in the display device 20; and the medical observation system 1 ends the operations.

(2) Determination Operation

Figure 8:
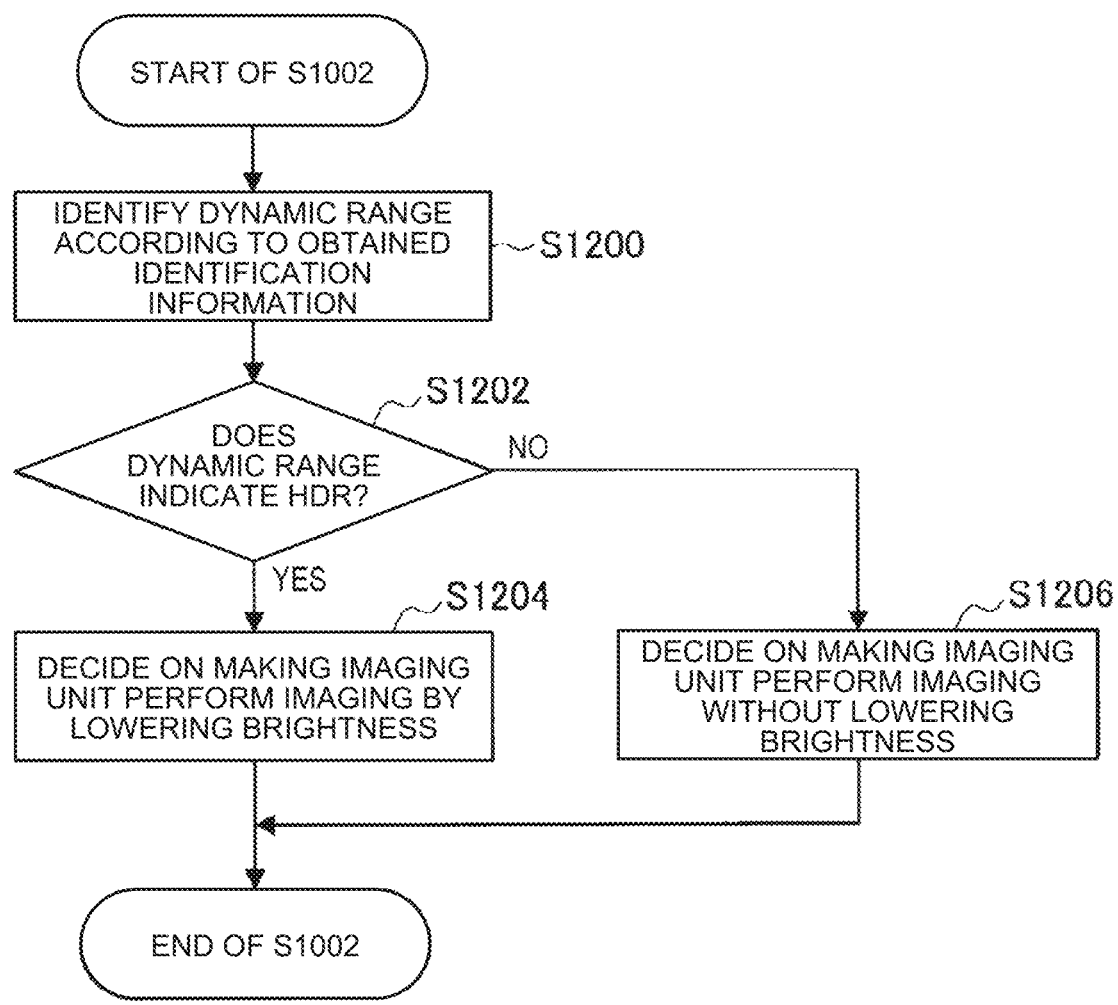
FIG. 8 is a flowchart for explaining the flow of operations performed in a determination operation according to the first embodiment.

Given below is the detailed explanation of the determination operation performed by the control unit 110 according to the first embodiment. FIG. 8 is a flowchart for explaining the flow of operations performed in the determination operation according to the first embodiment.

As illustrated in FIG. 8, firstly, the control unit 110 refers to the obtained determination information and identifies the dynamic range of the display device 20 that is connected to the medical observation device 10 (Step S1200). Then, the control unit 110 confirms whether or not the identified dynamic range is an HDR (Step S1202). If the identified dynamic range is an HDR (YES at Step S1202), then the control unit 110 decides to make the imaging unit 100 take images of the observation target by lowering the brightness (Step S1204). On the other hand, if the identified dynamic range is not an HDR (NO at Step S1202), then the control unit 110 decides to make the imaging unit 100 take images of the observation target without lowering the brightness (Step S1206). Then, the control unit 110 ends the determination operation.

(3) Correction Operation

Figure 9:
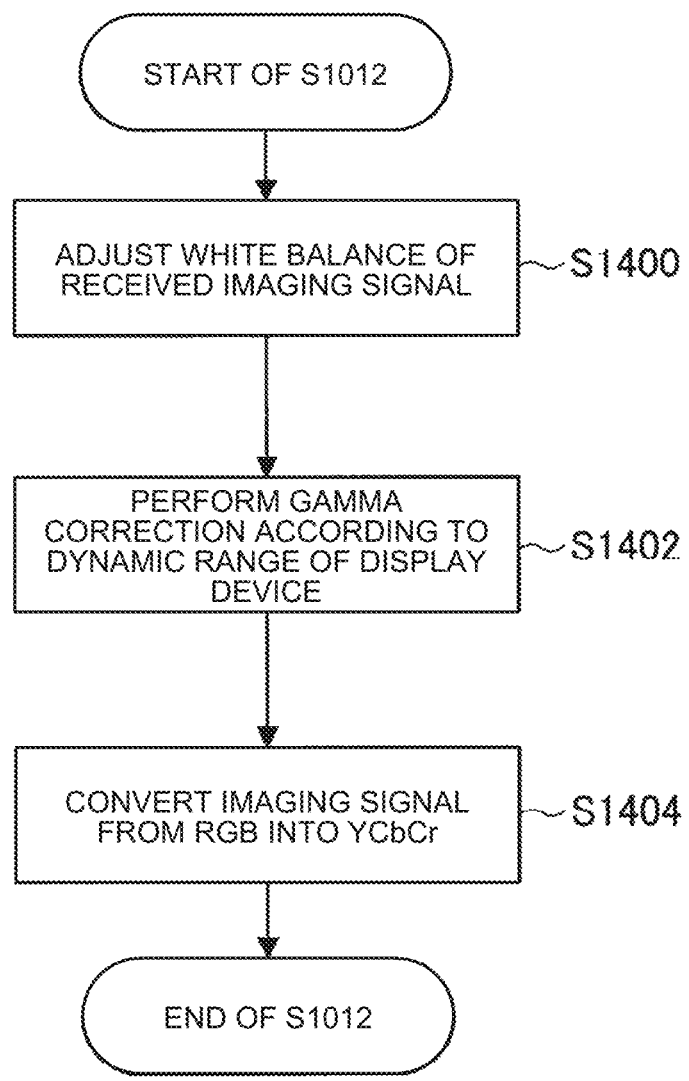
FIG. 9 is a flowchart for explaining the flow of operations performed in a correction operation according to the first embodiment.

Given below is the detailed explanation of the correction operation performed by the control unit 110 according to the first embodiment. FIG. 9 is a flowchart for explaining the flow of operations performed in the correction operation according to the first embodiment.

As illustrated in FIG. 9, firstly, the control unit 110 adjusts the white balance of the input imaging signal (Step S1400). Then, the control unit 110 performs gamma correction according to the dynamic range of the display device 20 (Step S1402). For example, when the dynamic range is an HDR; the control unit 110 performs gamma correction with respect to the imaging signal using the gamma value corresponding to the HDR. Similarly, when the dynamic range is an SDR; the control unit 110 performs gamma correction with respect to the imaging signal using the gamma value corresponding to the SDR. Then, the control unit 110 converts the post-gamma-correction imaging signal from RGB into YCbCr (Step S1404), and ends the correction operation.

(4) Display Operation

Figure 10:
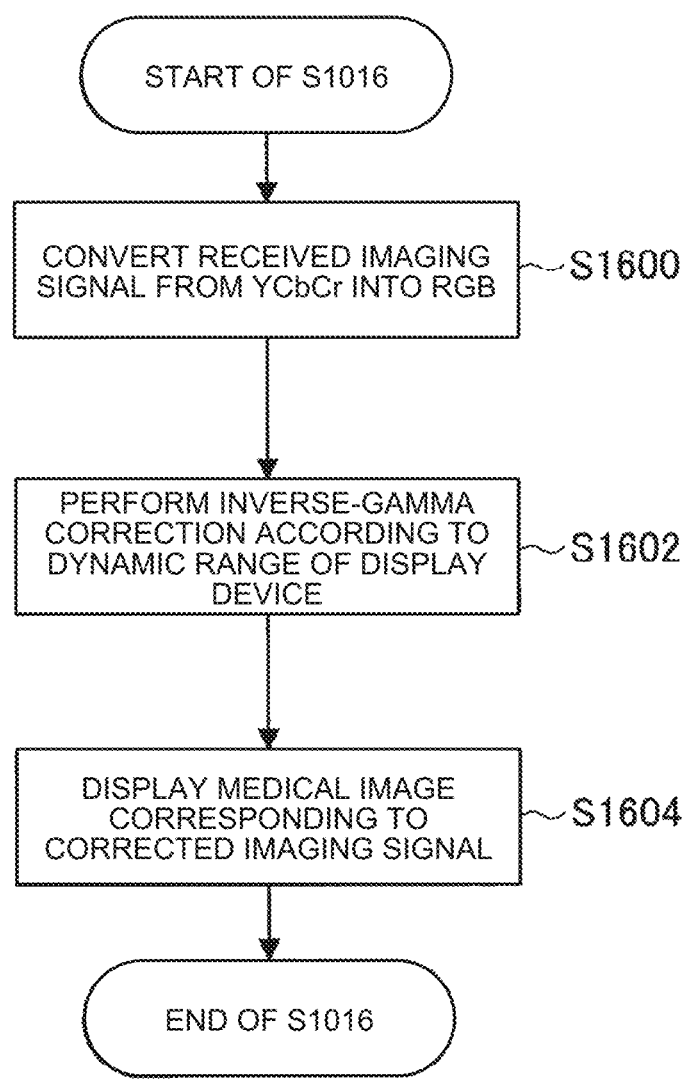
FIG. 10 is a flowchart for explaining the flow of operations performed in a display operation according to the first embodiment.

Given below is the detailed explanation of the display operation performed in the display device 20 according to the first embodiment. FIG. 10 is a flowchart for explaining the flow of operations performed in the display operation according to the first embodiment.

As illustrated in FIG. 10, firstly, the display device 20 converts the received imaging signal from YCbCr into RGB (Step S1600). Then, the display device 20 performs inverse-gamma correction with respect to the post-conversion imaging signal according to the dynamic range of the display device 20 (Step S1602). For example, when the dynamic range is an HDR, the display device 20 performs inverse-gamma correction with respect to the imaging signal using the gamma value corresponding to the HDR. Similarly, when the dynamic range is an SDR the display device 20 performs inverse-gamma correction with respect to the imaging signal using the gamma value corresponding to the SDR. Then, the display device 20 generates a medical image corresponding to the corrected imaging signal and displays the medical image (Step S1604); and then ends the display operation.

Till now, the first embodiment was explained with reference to FIGS. 2 to 10. Given below is the explanation of a second embodiment.

3. Second Embodiment

Explained below with reference to FIGS. 11 to 14 is the second embodiment. In the first embodiment described above, the explanation is given about an example in which a single display device 20 is connected to the medical observation device 10. In the second embodiment, the explanation is given about an example in which a plurality of display devices 20 is connected to the medical observation device 10. Meanwhile, the following explanation is given only about the differences with the first embodiment, and the identical points to the first embodiment are not explained again.

3.1. Exemplary System Configuration

Figure 11:
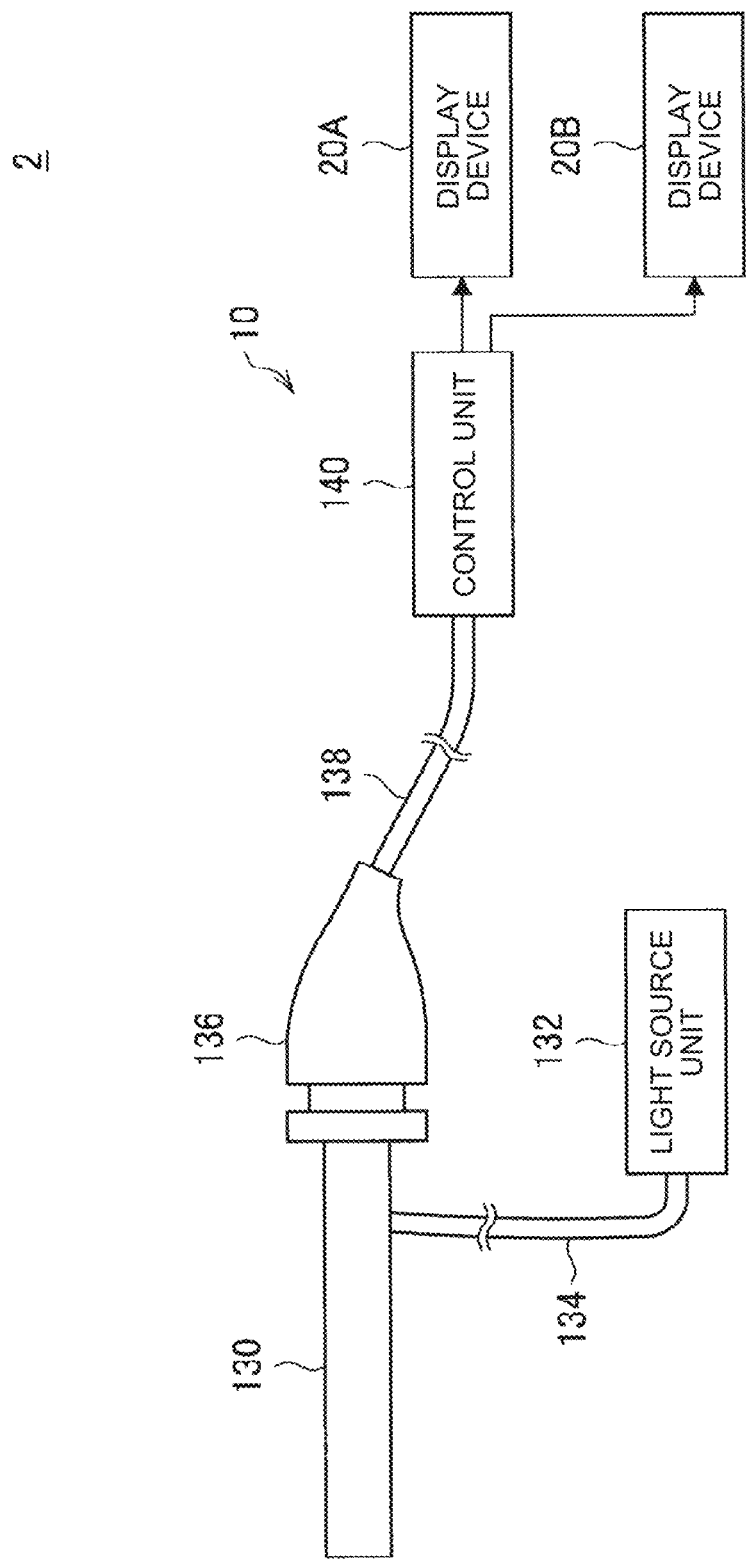
FIG. 11 is an explanatory diagram illustrating an exemplary configuration of a medical observation system according to a second embodiment.

Explained below with reference to FIG. 11 is an exemplary configuration or a medical observation system 2 according to the second embodiment. FIG. 11 is an explanatory diagram illustrating an exemplary configuration of the medical observation system 2 according to the second embodiment. As illustrated in FIG. 11, the medical observation system 2 according to the second embodiment includes, for example, the medical observation device 10, a display device 20A, and a display device 20B.

Apart from the fact that a plurality of display devices 20 is connected to the medical observation device 10, the system configuration of the medical observation system 2 according to the second embodiment is identical to the system configuration of the medical observation system 1 according to the first embodiment. Hence, in this section, the detailed explanation about the system configuration of the medical observation system 2 is not given.

3.2. Exemplary Functional Configuration

Given below is the explanation of an exemplary functional configuration of the medical observation device 10 according to the second embodiment. Although the functional configuration of the medical observation device 10 according to the second embodiment is identical to the functional configuration of the medical observation device 10 according to the first embodiment, there are some differences in the operations performed by the control unit 110. Hence, in this section, the explanation is given only about those different operations performed by the control unit 110.

(1) Control Unit 110

The functional configuration of the medical observation device 10 according to the second embodiment is identical to the functional configuration of the medical observation device 10 according to the first embodiment. However, there are some differences in the operations by each constituent element.

(1-1) Brightness Control Unit 112

The brightness control unit 112 according to the second embodiment differs from the brightness control unit 112 according to the first embodiment in the way that the reference display device 20 at the time of deciding on the brightness target value is selected from among a plurality of display devices 20. When a plurality of display devices 20 is present, the brightness control unit 112 controls the imaging performed in the imaging device in such a way that the imaging signals correspond to the dynamic range of the display device 20 selected from among a plurality of display devices 20.

The display device 20 selected from among a plurality of display devices 20 represents, for example, the display device 20 associated to a predetermined user. More particularly, as the display device 20 associated to a predetermined user, the display device 20 associated to the main operator can be selected. Alternatively, as the display device 20 associated to a predetermined user, the display device 20 associated to the assistant of the main operator can be selected. Meanwhile, the display device 20 selected from among a plurality of display devices 20 can be, for example, the display device 20 having the highest dynamic range from among the plurality of display devices 20. More particularly, as the display device 20 having the highest dynamic range, one of the HDR display devices 20 can be selected. Once a particular display device 20 is selected from among a plurality of display devices 20, the brightness control unit 112 decides on the brightness target value in an identical manner to the first embodiment.

(1-2) Display Control Unit 114

The display control unit 114 according to the second embodiment differs from the display control unit 114 according to the first embodiment in the way of generating a plurality of imaging signals matching with the characteristics of the display devices 20, with the aim of displaying a medical image in the plurality of display devices 20.

Figure 12:
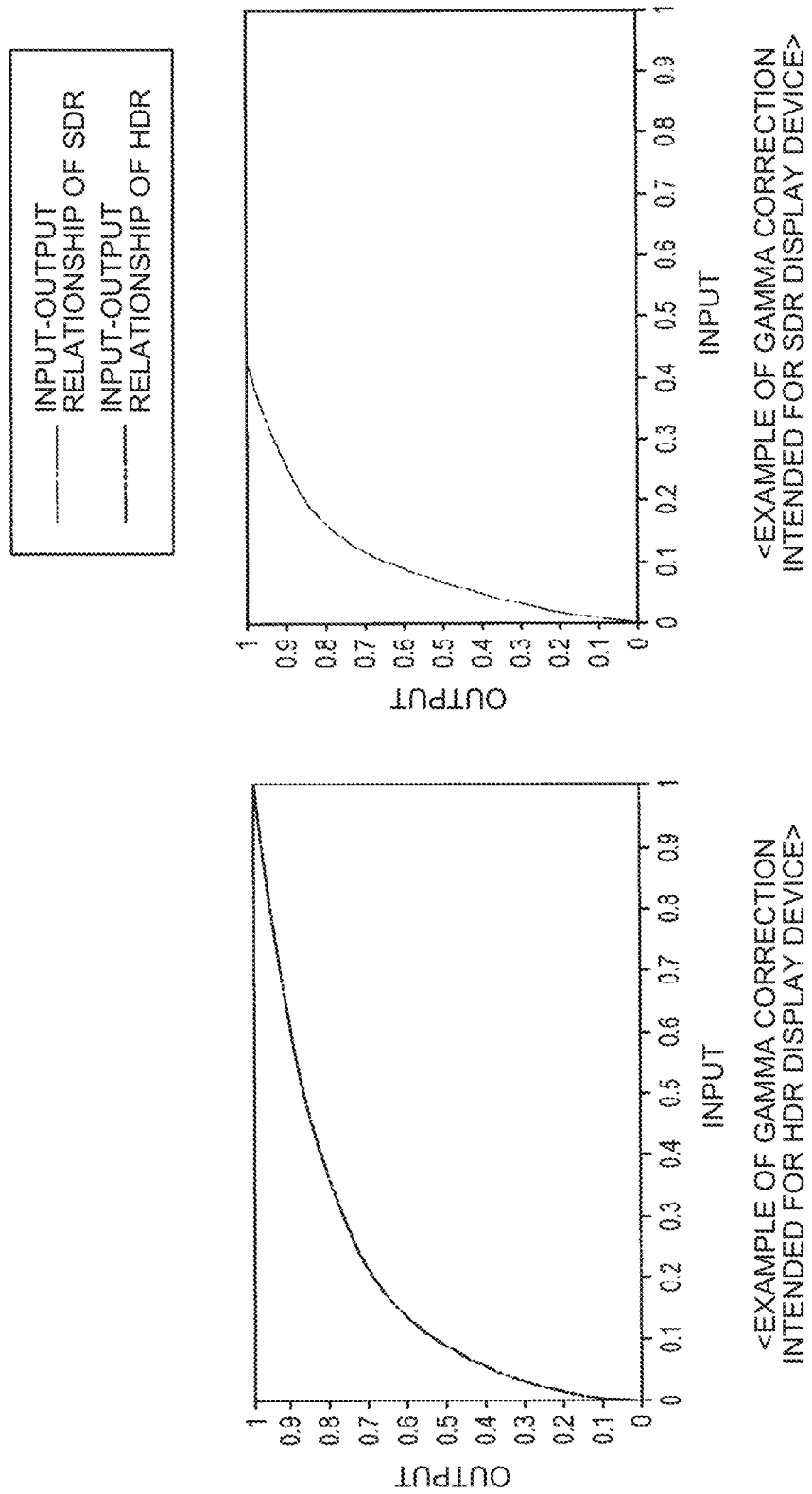
FIG. 12 is an explanatory diagram illustrating an example of gamma correction intended for a plurality of display devices according to the second embodiment.

When a plurality of display devices 20 is present, the display control unit 114 displays, in each display device 20, a medical image generated from the imaging signal that is subjected to gamma correction based on the gamma value set in the concerned display device 20. Explained below with reference to FIG. 12 is an example of the gamma correction according to the second embodiment. FIG. 12 is an explanatory diagram illustrating an example of the gamma correction intended for a plurality of display devices 20 according to the second embodiment. In the left part in FIG. 12, an example of the gamma correction intended for the HDR display devices 20 is illustrated. In the right part in FIG. 12, an example of the gamma correction intended for the SDR display devices 20 is illustrated.

For example, the display control unit 114 performs gamma correction illustrated in the left-side graph in FIG. 12 with respect to an imaging signal, and generates an imaging signal intended for the HDR display devices 20 from among a plurality of display devices 20. Similarly, the display control unit 114 performs gamma correction illustrated in the right-side graph in FIG. 12 with respect to an imaging signal, and generates an imaging signal intended for the SDR display devices 20 from among a plurality of display devices 20. In the gamma correction illustrated in the left-side graph in FIG. 12, gamma correction is performed using the entire imaging signal that is input. In contrast, in the gamma correction illustrated in the right-side graph in FIG. 12, gamma correction is performed using only the low-level portion of the imaging signal that is input. As a result, the display control unit 114 becomes able to saturate the high-luminance portion of the medical image to be displayed in the SDR display devices 20.

Meanwhile, if a medical image having the brightness corresponding to the brightness target value for the HDR display devices 20 as decided by the brightness control unit 112 is to be displayed in the SDR display devices 20, the display control unit 114 can multiply a gain to the entire taken image. More particularly, a coefficient that is based on the ratio of the brightness target value for the HDR display devices 20 and the brightness target value for the SDR display devices 20, which are decided by the brightness control unit 112, can be multiplied as the gain to the medical image. As a result, when a medical image having the brightness corresponding to the HDR display devices 20 is to be displayed in the SDR display devices 20, it becomes possible to display the taken image with excellent brightness in the SDR display device 20 too.

3.3. Example of Operations

Figure 13:
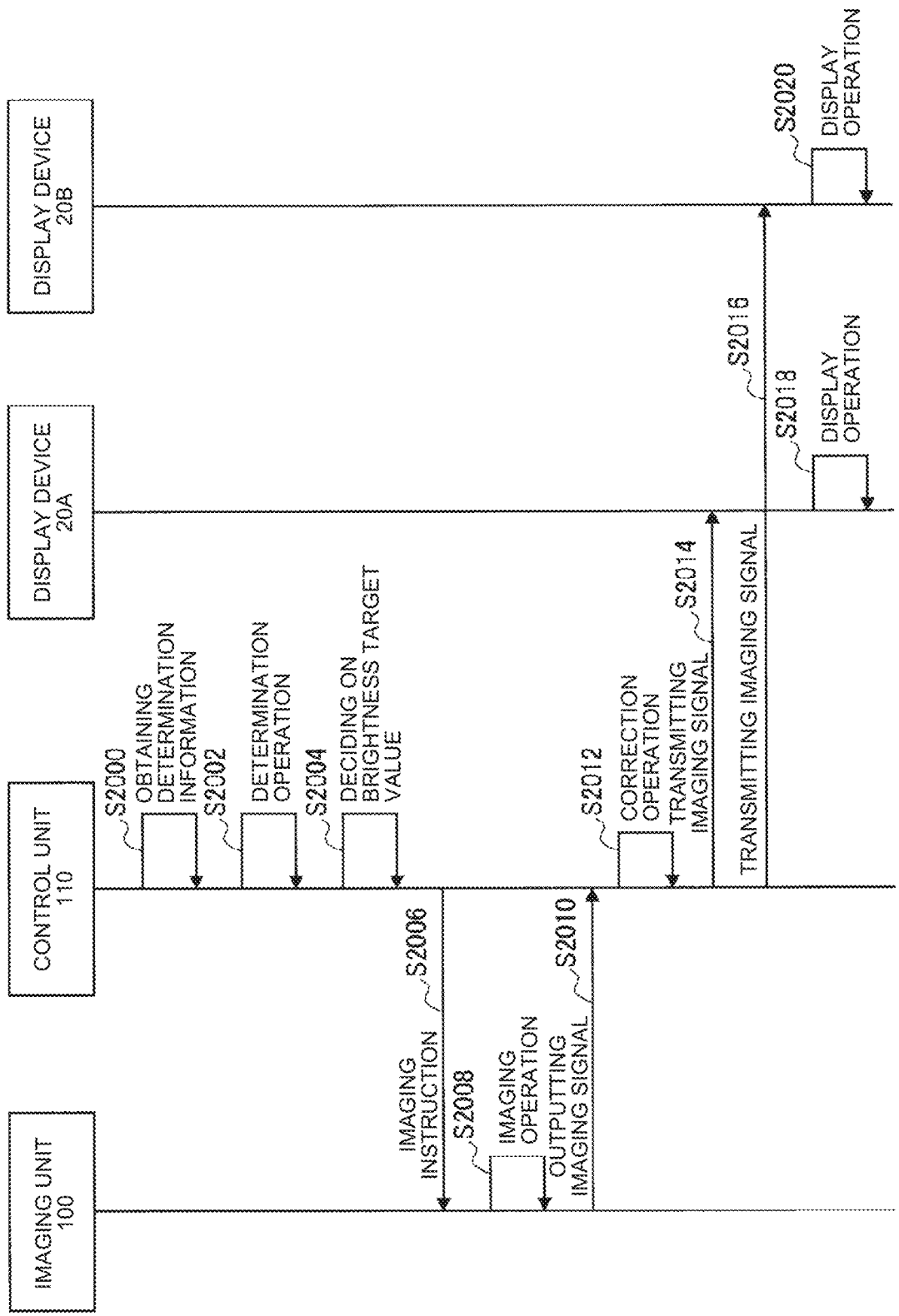
FIG. 13 is a sequence diagram for explaining the flow of operations performed in the medical observation system according to the second embodiment.
Figure 14:
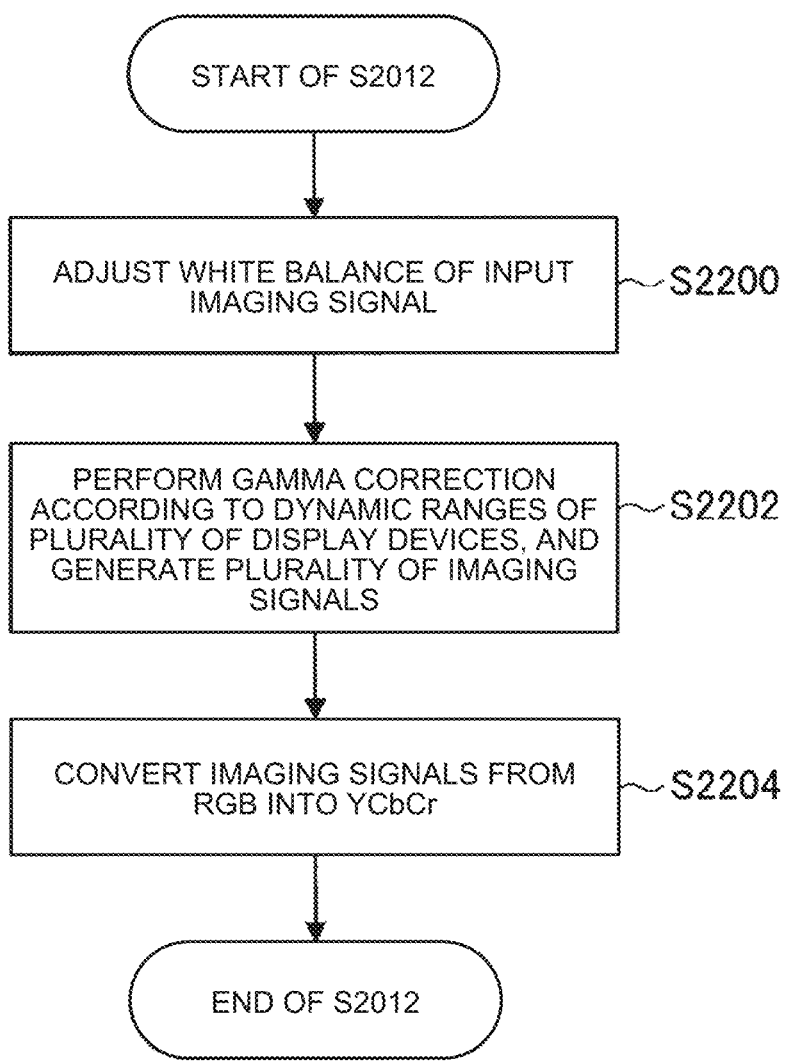
FIG. 14 is a flowchart for explaining the flow of operations performed in a correction operation according to the second embodiment.

Explained below with reference to FIGS. 13 and 14 is an example of the operations performed in the medical observation system 2 according to the second embodiment.

(1) Example of Operations of Entire Medical Observation System 2

Firstly, the explanation is given about a sequence of operations performed in the medical observation system 2 for displaying a medical image in a plurality of display devices 20. FIG. 13 is a sequence diagram for explaining the flow of operations performed in the medical observation system 2 according to the second embodiment.

As illustrated in FIG. 13, firstly, the control unit 110 obtains the determination information (Step S2000). Then, based on the determination information, the control unit 110 performs the determination operation for determining the dynamic ranges of the display devices 20A and 20B that are connected to the medical observation device 10 (Step S2002). Herein, the details of the determination operation are identical to the determination operation explained in the first embodiment. Hence, that explanation is not given again in this section. Subsequently, based on the result of the determination operation, the control unit 110 decides on the brightness target value (Step S2004). Then, the control unit 110 outputs an imaging instruction to the imaging unit 100 for taking a medical image having the brightness equivalent to the decided brightness target value (Step S2006).

Upon receiving input of the imaging instruction from the control unit 110, the imaging unit 100 takes an image of the observation target according to the imaging instruction (Step S2008) and outputs an imaging signal, which is obtained as a result of performing imaging, to the control unit 110 (Step S2010).

Upon receiving the imaging signal from the imaging unit 100, the control unit 110 performs a correction operation with respect to the imaging signal according to each of the display devices 20A and 20B to which the imaging signal is to be transmitted (Step S2012). Regarding the details of the correction operation, the explanation is given later. After performing the correction operation, the control unit 110 sends the corrected imaging signal to the display devices 20A and 20B via the communication unit 120 (Steps S2014 and S2016).

Upon receiving the imaging signal, the display devices 20A and 20B perform the display operation for displaying the imaging signal as a medical image (Steps S2018 and S2020). The details of the display operation are identical to the display operation explained in the first embodiment. Hence, that explanation is not given again in this section. As a result of performing the display operation, the medical image gets displayed in the display devices 20A and 20B; and the medical observation system 2 ends the operations.

(2) Correction Operation

Given below is the detailed explanation of the correction operation performed in the control unit 110 according to the second embodiment. FIG. 14 is a flowchart for explaining the flow of operations performed in the correction operation according to the second embodiment.

As illustrated in FIG. 14, firstly, the control unit 110 adjusts the white balance of the input imaging signal (Step S2200). Then, the control unit 110 performs gamma correction according to the dynamic range of each of a plurality of display devices 20 and generates a plurality of imaging signals (Step S2202). For example, if the dynamic range of the display device 20A is an HDR, then the control unit 110 performs gamma correction with respect to the imaging signal using the gamma value corresponding to the HDR, and generates an imaging signal to be transmitted to the display device 20A. Similarly, if the dynamic range of the display device 20B is an SDR, then the control unit 110 performs gamma correction with respect to the imaging signal using the gamma value corresponding to the SDR, and generates an imaging signal to be transmitted to the display device 20B. Then, the control unit 110 converts the post-gamma-correction imaging signals from RGB into YCbCr (Step S2204), and ends the correction operation.

Till now, the second embodiment was explained with reference to FIGS. 11 to 14. Given below is the explanation of modification examples of the embodiments according to the present disclosure.

4. Modification Examples

Given below is the explanation of the modification examples of the embodiments of the present disclosure. The modification examples can be applied, either individually or in combination, to the embodiments of the present disclosure. Moreover, the modification examples can be applied in place of the configurations explained in the embodiments of the present disclosure, or can be applied in addition to the configurations explained in the embodiments of the present disclosure.

4.1. First Modification Example

Given below is the explanation of a first modification example of the embodiments according to the present disclosure.

In the embodiments described above, the explanation is given for an example in which the control unit 110 decides on the brightness target value based on the dynamic range. In the first modification example, the explanation is given for an example in which the control unit 110 decides on the brightness target value further based on the display mode of the display device 20.

Examples of the display mode include a 3D mode in which the medical images are displayed in a 3D view, and a 2D mode in which the medical images are displayed in a 2D view. Generally, in the display device 20 capable of displaying the medical images in the 3D mode (for example, 3D glasses); the display is performed with a lower brightness in comparison to the display device 20 for displaying the medical images in the 2D mode. Hence, in the case of the 3D mode, the control unit 110 decides on the brightness target value by taking into account the fact that the medical images are displayed with a lower brightness in comparison to the 2D mode. For example, the control unit 110 decides on the brightness target value by taking into account the fact that the imaging device takes images of the observation target by increasing the brightness, and that the 3D glasses representing the display device 20 display the medical images by reducing the brightness. In the case of the 2D mode, the control unit 110 can decide on the brightness target value in an identical manner to the embodiments described above.

As described above, as a result of deciding on the brightness target value by also taking into account the display mode of the display device 20, the medical images having a more suitable brightness can be displayed in the display device 20, thereby enabling achieving enhancement in the visibility of the user at the time of viewing the medical images.

4.2. Second Modification Example

Figure 15:
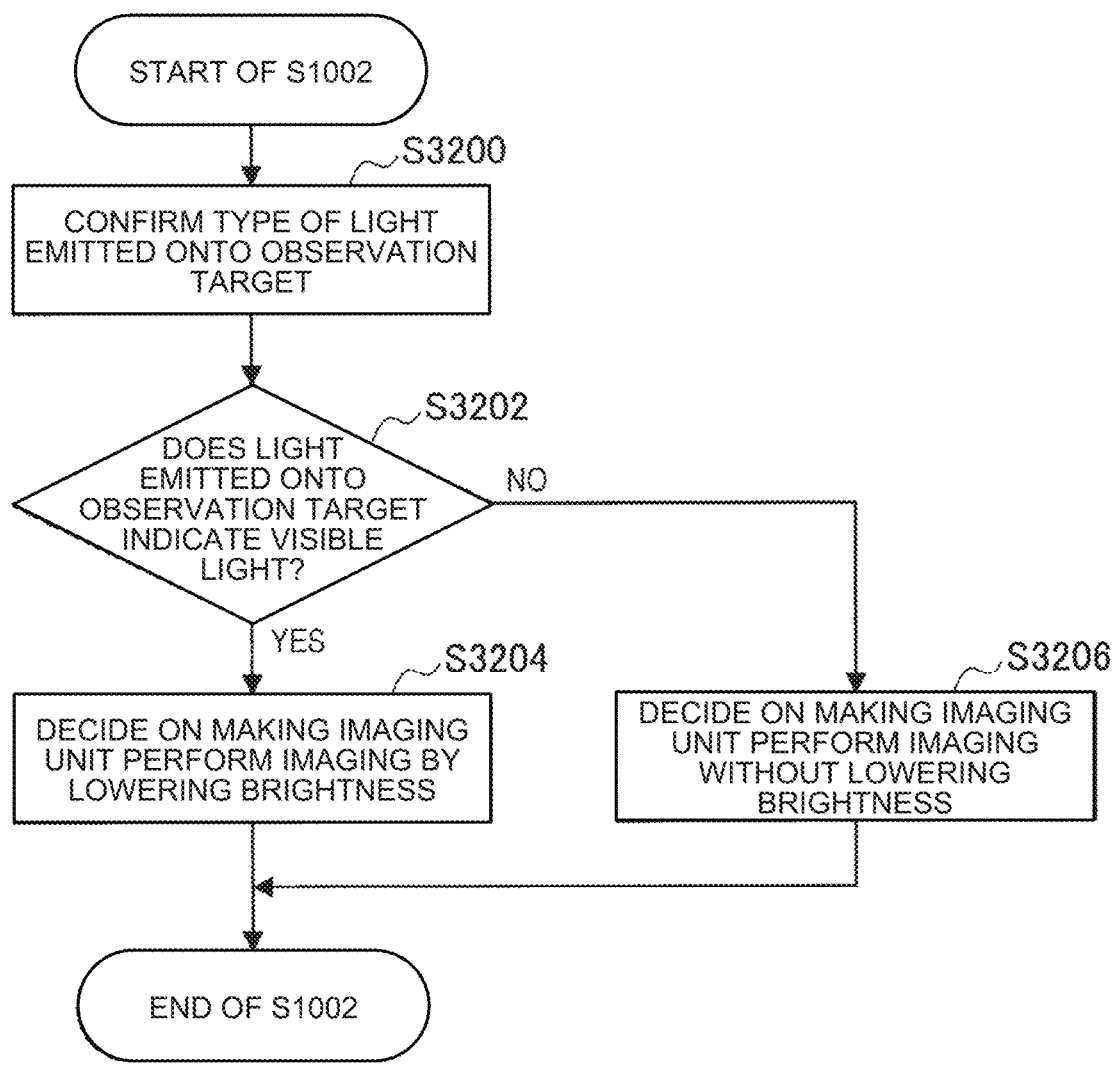
FIG. 15 is an explanatory diagram for explaining the determination operation according to a second modification example.

Explained below with reference to FIG. 15 is a second modification example of the embodiments according to the present disclosure. FIG. 15 is an explanatory diagram for explaining the determination operation according to the second modification example.

In the embodiments and the first modification described above, the explanation is given about an example in which the control unit 110 decides on the brightness target value based on the dynamic range and an example in which the control unit 110 decides on the brightness target value based on the display mode of the display device 20. In the second modification example, the explanation is given about an example in which the control unit 110 decides on the brightness target value further based on the type of the imaging device.

In the embodiments described above, the explanation is given about an example in which the imaging device emits visible light (for example, white light) onto the observation target at the time of taking images of the observation target. Alternatively, for example, it is possible to use an imaging device that emits a special light onto the observation target at the time of taking images of the observation target. A medical image that is taken using a special light does not have halation. Hence, if the imaging device uses a special light to take images of the observation target, the control unit 110 decides on the brightness target value by taking into account the fact that the imaging device takes images of the observation target without lowering the brightness and that the display device 20 displays the medical images without increasing the brightness.

Meanwhile, it is also possible to use an imaging device that takes images by switching between visible light and a special light at regular intervals. Herein, a plurality of medical images that are taken by switching between visible light and a special light at regular intervals is superimposed, and the superimposed medical image is displayed in the display device 20. A medical image taken using visible light is ensured to have a lower brightness as explained earlier. Hence, at the time of displaying the superimposed medical image, if the display device 20 does not perform any particular processing with respect to the superimposed medical image, the superimposed medical image gets displayed with a lower brightness. For that reason, when the imaging device takes images by switching between visible light and a special light, the control unit 110 decides on the brightness target value by taking into account the fact that the display device 20 displays the superimposed medical image by increasing the brightness.

Meanwhile, when the imaging device takes images of the observation target using visible light, the control unit 110 makes the imaging device take images of the observation target by lowering the brightness. On the other hand, when the imaging device takes images of the observation target using a special light, the control unit 110 makes the imaging device take images of the observation target without lowering the brightness.

When the imaging device takes images of the observation target by switching between visible light and a special light at regular intervals, the flow of the determination operation is different than the explanation given earlier in the embodiments. Hence, the determination operation is explained below with reference to FIG. 15. As illustrated in FIG. 15, firstly, the control unit 110 confirms the type of the light emitted by the imaging device onto the observation target (Step S3200). Then, the control unit 110 confirms whether or not the light emitted onto the observation target is visible light (Step 33202). If the light emitted onto the observation target is visible light (YES at Step S3202), then the control unit 110 decides to make the imaging unit 100 take images of the observation target by lowering the brightness (Step S3204). On the other hand, if the light emitted onto the observation target is not visible light (NO at Step S3202), then the control unit 110 decides to make the imaging unit 100 take images of the observation target without lowering the brightness (Step S3206). Then, the control unit 110 ends the determination operation.

As described above, the control unit 110 decides on the brightness target value by also taking into account the type of the imaging device. Hence, the medical images having a still more suitable brightness can be displayed in the display device 20, thereby enabling achieving enhancement in the visibility of the user at the time of viewing the medical images.

4.3. Third Modification Example

Given below is the explanation of a third modification example of the embodiments according to the present disclosure.

According to the luminance of the medical image when displayed in the display device 20, the display control unit 114 adjusts the luminance of the characters displayed in the display device 20. For example, according to the luminance of the medical image when displayed in the display device 20, the display control unit 114 can lower the luminance of the information displayed using the OSD (On Screen Display) (hereinafter, also called OSD information). When the dynamic range of the display device 20 is an HDR, the display control unit 114 increases the luminance of the display device 20 at the time of displaying the medical image taken with a lower brightness. Consequently, the OSD information also gets displayed in a bright manner, and it may lead to a decline in the visibility of the OSD information. In that regard, at the time of displaying the OSD information, the display control unit 114 lowers the luminance by the same ratio as the ratio by which the brightness of the imaging device was lowered at the time of taking images of the observation target; and then displays the OSD information in the display device 20. As a result, the display control unit 114 becomes able to display the OSD information with a lower brightness as compared to the medical image in the display device 20.

As described above, the display control unit 114 can display the OSD information in the display device 20 by lowering the luminance of the OSD information to be lower than the luminance of the medical image, and thus can enhance the visibility of the user at the time of viewing the OSD information.

4.4. Fourth Modification Example

Given below is the explanation of a fourth modification example of the embodiments according to the present disclosure.

When the dynamic range of the display device 20 is an HDR, the imaging device according to the embodiments described above takes images of the observation target by lowering the brightness, and thus the digital gain increases by the amount of brightening at the time of imaging. Because of an increase in the digital gain, the SN ratio (Signal-Noise ratio) deteriorates, and the noise in the medical image increases. In that regard, when the dynamic range of the display device 20 is an HDR, the control unit 110 can also perform noise reduction with respect to the imaging signals. For example, the control unit 110 performs noise reduction during the correction operation. Moreover, even when the dynamic range of the display device 20 is an SDR, the control unit 110 can perform noise reduction. Meanwhile, when the dynamic range of the display device 20 is an HDR, there is more noise in the medical image than in the case in which the dynamic range of the display device 20 is an SDR. Hence, when the dynamic range of the display device 20 is an HDR, it is desirable that the control unit 110 performs noise reduction with a higher intensity than the noise reduction performed when the dynamic range of the display device 20 is an SDR.

As described above, the display control unit 114 can perform noise reduction with respect to an imaging signal so as to reduce the noise included in the imaging signal, and thus can enhance the visibility of the user at the time of viewing the medical image.

4.5. Fifth Modification Example

Given below is the explanation of a fifth modification example of the embodiments according to the present disclosure.

In the embodiments described above, the explanation is given for an example in which the control unit 110 controls the amount of light projected from the light source unit 132 and adjusts the brightness at the time of imaging. Alternatively, the brightness at the time of imaging can be adjusted by controlling the aperture of the image sensor of the camera head 136. For example, in the embodiments described below, the control unit 110 reduces the amount of light projected from the light source unit 132 and lowers the brightness at the time of imaging. Alternatively, the control unit 110 can reduce the aperture the image sensor so as to reduce the amount of light passing through the lens, and can lower the brightness at the time of imaging.

Accompanying the decrease in the aperture of the image sensor, there is an increase in the depth of field. That leads to an increase in the range within which the observation target remains in focus even after moving close to or moving away from the imaging device, and thus it becomes easier for the user to observe the observation target.

5. Summary

As described above, the medical control device according to the embodiments of the present disclosure controls the brightness of an imaging signal generated by an imaging device that receives the light coming from the observation target. Moreover, the medical control device displays a medical image, which is generated from the imaging signal, in the display device 20 that displays images. Moreover, the medical control device controls the brightness of the imaging signal in such a way that, higher the dynamic range of the display device 20, the lower becomes the brightness of the imaging signal. As a result, the medical control device becomes able to restore and display, in the HDR display device 20, the portion saturated in the medical image displayed in the SDR display device 20.

As a result, it becomes possible to provide a medical control device and a medical observation device in a new and improved form that enable achieving reduction in the halation occurring in medical images.

Although the present disclosure is described above in detail in the form of preferred embodiments with reference to the accompanying drawings; the technical scope of the present disclosure is not limited to the embodiments described above. That is, the present disclosure is to be construed as embodying all modifications such as other embodiments, additions, alternative constructions, and deletions that may occur to one skilled in the art that fairly fall within the basic teaching herein set forth. In any form thereof, as long as the functions/effects of the present disclosure are achieved, the modifications are included in the scope of the present disclosure.

For example, each device explained in the present written description can be implemented as an individual device, or the devices can be partially or entirely implemented as separate devices. For example, the medical observation device 10, the display device 20, and the medical control device can be implemented as individual devices. Alternatively, the medical observation device 10, the display device 20, and the medical control device can be implemented as server devices connected via a network.

Moreover, the medical observation device 10 explained in the present written description can be configured as a system in which the constituent elements are partially or entirely implemented as separate devices. For example, it is possible to have a system in which the medical observation device 10 includes a light source and an imaging device, and the control unit is implemented using an external device.

Meanwhile, the sequence of operations performed by each device explained in the present written description can be implemented either using software, or using hardware, or using a combination of software and hardware. The programs constituting software are stored in advance in a recording medium (non-transitory medium) installed inside or outside of each device. Then, for example, each program is read into a RAM at the time of execution by a computer, and is executed by a processor such as a CPU.

Meanwhile, the operations explained with reference to the flowcharts and the sequence diagrams in the present written description need not necessarily be performed in the order illustrated in drawings. That is, some of the operation steps can be performed in parallel. Moreover, additional operation steps can be included, and some of the operation steps can be omitted.

The effects described in the present written description are only explanatory and exemplary, and are not limited in scope. That is, in addition to or in place of the effects described above, the technology disclosed in the present disclosure enables achieving other effects that may occur to one skilled in the art.

Meanwhile, a configuration as explained below also falls within the technical scope of the present disclosure.

(1)
A medical control device including:
a brightness control unit that controls brightness of an imaging signal generated by an imaging device which receives light coming from an observation target; and
a display control unit that displays, in a display device for displaying images, a medical image which is generated from the imaging signal, wherein
the brightness control unit controls brightness of the imaging signal to become lower in inverse proportion to dynamic range of the display device.

(2)
The medical control device according to (1), wherein the brightness control unit identifies dynamic range of the display device and decides on brightness target value corresponding to the identified dynamic range of the display device.

(3)
The medical control device according to (2), wherein, based on predetermined selection operation, the brightness control unit identifies dynamic range of the display device.

(4)
The medical control device according to (2), wherein the brightness control unit identifies dynamic range of the display device based on dynamic range information indicating dynamic range of the display device.

(5)
The medical control device according to (4), wherein the dynamic range information is obtained from the display device.

(6)
The medical control device according to (4), wherein the dynamic information is obtained based on identification information that is obtained from the display device.

(7)
The medical control device according to any one of (2) to (6), wherein the brightness control unit compares dynamic range of the display device with predetermined dynamic range, and decides on the brightness target value based on result of comparison.

(8)
The medical control device according to (7), wherein the brightness control unit decides on the brightness target value based on difference between maximum value of dynamic range of the display device and maximum value of the predetermined dynamic range.

(9)
The medical control device according to (8), wherein, when maximum value of dynamic range of the display device is n times maximum value of the predetermined dynamic range (where n is a real number), the brightness control unit sets the brightness target value in the display device to 1/n-th of brightness target value corresponding to the predetermined dynamic range.

(10)
The medical control device according to (1) to (9), wherein, when a plurality of the display device is present, the brightness control unit controls imaging by the imaging device in such a way that the imaging signal has brightness corresponding to dynamic range of the display device that is selected from among the plurality of display devices.

(11)
The medical control device according to (10), wherein the display device selected from among the plurality of display devices is the display device associated to predetermined user.

(12)
The medical control device according to (10) or (11), wherein the display device selected from among the plurality of display devices is the display device having highest dynamic range from among the plurality of display devices.

(13)
The medical control device according to any one of (1) to (12), wherein the display control unit performs gamma correction with respect to the imaging signal based on gamma value of the display device, and displays, in the display device, the medical image generated from the imaging signal that has been subjected to the gamma correction.

(14)
The medical control device according to (13), wherein the display control unit performs the gamma correction with respect to the imaging signal in such a way that intermediate luminance values of the medical image displayed in the display device are identical to intermediate luminance values of the medical image displayed in a display device having predetermined gamma value.

(15)
The medical control device according to (13) or (14), wherein, when a plurality of the display device is present, the display control unit displays, in each of the plurality of display devices, the medical image generated from the imaging signal that has been subjected to the gamma correction based on the gamma value of corresponding display device.

(16)
The medical control device according to (2), wherein the brightness control unit decides on the brightness target value further based on display mode of the display device.

(17)
The medical control device according to (2) or (16), wherein the brightness control unit decides on the brightness target value further based on type of the imaging device.

(18)
The medical control device according to any one of (1) to (17), wherein the display control unit adjusts luminance of characters, which are displayed in the display device, according to luminance of the medical image when the medical image is displayed in the display device.

(19)
A medical observation device including:
a light source that emits light;
an imaging device that takes an image of an observation target; and
a control unit that controls brightness of an imaging signal generated by the imaging device which receives reflected light coming from the observation target that is illuminated with the light, and displays a medical image, which is generated from the imaging signal, in a display device, wherein the control unit controls brightness of the imaging signal to become lower in inverse proportion to dynamic range of the display device.

REFERENCE SIGNS LIST 1, 2 medical observation system
10 medical observation device
20 display device
100 imaging unit
110 control unit
112 brightness control unit
114 display control unit
120 communication unit
130 insertion member
132 light source unit
134 light guide
136 camera head
138 cable
140 control unit

The invention claimed is:

1. A medical control device comprising: control circuitry configured to output a medical image to a first display having a first dynamic range and a second display having a second dynamic range, greater than the first dynamic range, wherein the medical image is generated from an imaging signal generated by an image sensor configured to receive light coming from an observation target to one of the first display and the second display; and when the medical image is to be output to the first display, the control circuitry is configured to set brightness of the imaging signal used to generate the medical image to a first brightness, and when the medical image is to be output to the second display having the second dynamic range, the control circuitry is configured to set brightness of the imaging signal used to generate the medical image to a second brightness that is lower than the first brightness by reducing the amount of light irradiated onto the observation target or the amount of light incident on the image sensor.

2. The medical control device according to claim 1, wherein the control circuitry is configured to identify dynamic range of the display and decide on brightness target value for the imaging signal in a corresponding manner to the identified dynamic range of the display.

3. The medical control device according to claim 2, wherein the control circuitry is configured to identify dynamic range of the display based on dynamic range information indicating dynamic range of the display.

4. The medical control device according to claim 3, wherein the dynamic range information is obtained from the display.

5. The medical control device according to claim 3, wherein the dynamic range information is obtained based on identification information obtained from the display.

6. The medical control device according to claim 2, wherein the control circuitry is configured to compare dynamic range of the display with predetermined dynamic range, and decide on the brightness target value based on result of comparison.

7. The medical control device according to claim 6, wherein the control circuitry is configured to decide on the brightness target value based on difference between maximum value of dynamic range of the display and maximum value of the predetermined dynamic range.

8. The medical control device according to claim 7, wherein, when maximum value of dynamic range of the display is n times maximum value of the predetermined dynamic range (where n is a real number), the control circuitry is configured to set the brightness target value in the display to 1/n-th of brightness target value corresponding to the predetermined dynamic range.

9. The medical control device according to claim 2, wherein the control circuitry is configured to decide on the brightness target value further based on display mode of the display.

10. The medical control device according to claim 2, wherein the control circuitry is configured to decide on the brightness target value further based on type of the image sensor.

11. The medical control device according to claim 1, wherein, when a plurality of displays is present, the control circuitry is configured to control imaging by the image sensor in such a way that the imaging signal has brightness corresponding to dynamic range of the display that is selected from among the plurality of displays.

12. The medical control device according to claim 11, wherein the display selected from among the plurality of displays is the display associated to predetermined user.

13. The medical control device according to claim 11, wherein the display selected from among the plurality of displays is the display having highest dynamic range from among the plurality of displays.

14. The medical control device according to claim 1, wherein the control circuitry is configured to perform gamma correction with respect to the imaging signal based on gamma value of the display, and display, in the display, the medical image generated from the imaging signal that has been subjected to the gamma correction.

15. The medical control device according to claim 14, wherein the control circuitry is configured to perform the gamma correction with respect to the imaging signal in such a way that intermediate luminance values of the medical image displayed in the display are identical to intermediate luminance values of the medical image displayed in a display having predetermined gamma value.

16. The medical control device according to claim 14, wherein, when a plurality of displays is present, the control circuitry is configured to display, in each of the plurality of displays, the medical image generated from the imaging signal that has been subjected to the gamma correction based on the gamma value of corresponding display.

17. The medical control device according to claim 1, wherein the control circuitry is configured to adjust luminance of characters, which are displayed in the display, according to luminance of the medical image when the medical image is displayed in the display.

18. The medical control device according to claim 1, wherein the control circuitry is configured to control brightness of the imaging signal by controlling amount of light emitted onto the observation target or by controlling amount of light falling on the image sensor.

19. The medical control device according to claim 1, wherein the control circuitry is configured to receive a user input whether the medical image is to be output to the first display or the second display and to set a brightness of the image signal based on the user input.

20. A medical observation system comprising: a light source configured to emit light; an image sensor configured to capture an image of an observation target; and circuitry configured to: output a medical image to a first display having a first dynamic range and a second display having a second dynamic range, greater than the first dynamic range wherein the medical image is generated from an imaging signal generated by an image sensor configured to receive light coming from an observation target to one of the first display and a second display; and when the medical image is to be output to the first display, the control circuitry is configured to set brightness of the imaging signal used to generate the medical image to a first brightness, and when the medical image is to be output to the second display having the second dynamic range, the control circuitry is configured to set brightness of the imaging signal used to generate the medical image to a second brightness that is lower than the first brightness by reducing the amount of light irradiated onto the observation target or the amount of light incident on the image sensor.

21. The medical observation system according to claim 20, wherein control of the brightness of the imaging signal includes at least one of controlling an amount of light emitted by the light source and controlling an aperture of the image sensor.

* * * * *